(12) United States Patent  
Malta et al.

(10) Patent No.: US 12,415,548 B1
(45) Date of Patent: Sep. 16, 2025

(54) HOLISTIC AND INCLUSIVE WAYFINDING

(71) Applicant: Waymo LLC, Mountain View, CA (US)

(72) Inventors: Kevin Malta, San Francisco, CA (US); Maria Moon, Mountain View, CA (US); Lauren Schwendimann, Burlingame, CA (US); Bruce Mai, Sacramento, CA (US); Jonathan Willing, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 321 days.

(21) Appl. No.: 18/098,788

(22) Filed: Jan. 19, 2023

Related U.S. Application Data

(60) Provisional application No. 63/302,600, filed on Jan. 25, 2022.

(51) Int. Cl.
*B60W 60/00* (2020.01)
*B60W 50/14* (2020.01)
*G01C 21/34* (2006.01)

(52) U.S. Cl.
CPC ...... *B60W 60/00253* (2020.02); *B60W 50/14* (2013.01); *G01C 21/3476* (2013.01); *B60W 2050/143* (2013.01); *B60W 2050/146* (2013.01); *B60W 2556/40* (2020.02)

(58) Field of Classification Search
CPC .......... B60W 50/14; B60W 60/00253; B60W 2050/143; B60W 2050/146; B60W 2556/40; G01C 21/3476
See application file for complete search history.

(56) References Cited

U.S. PATENT DOCUMENTS

| 10,809,081 | B1 * | 10/2020 | Kentley-Klay | ........ G08G 1/202 |
| 10,837,788 | B1 * | 11/2020 | Kentley-Klay | .... G01C 21/3438 |
| 2020/0359216 | A1 * | 11/2020 | Akpinar | ................ H04W 4/024 |
| 2023/0048235 | A1 * | 2/2023 | Rogan | ................... G06T 19/006 |

* cited by examiner

*Primary Examiner* — Dale Moyer
(74) *Attorney, Agent, or Firm* — Botos Churchill IP Law LLP

(57) ABSTRACT

The technology employs a holistic approach to passenger pickups and other wayfinding situations. This includes identifying where passengers are relative to the vehicle and/or the pickup location. One aspect leverages camera imagery from a rider's client device when providing rider support. This enables an agent to receive the imagery to help guide the rider to the vehicle. Another aspect provides audio information to the rider to help them get to the vehicle. This can include selecting or curating various tones or melodies, giving the rider advanced notice of sounds to listen for, and modifying sounds as the rider approaches the vehicle or to address ambient noise in the environment. Different wayfinding tools may be selected for presentation to the rider based on their proximity state to a pickup location or to the vehicle. Gracefully transitioning between different tools can enhance their usefulness and elevate the rider's experience for a trip.

21 Claims, 29 Drawing Sheets

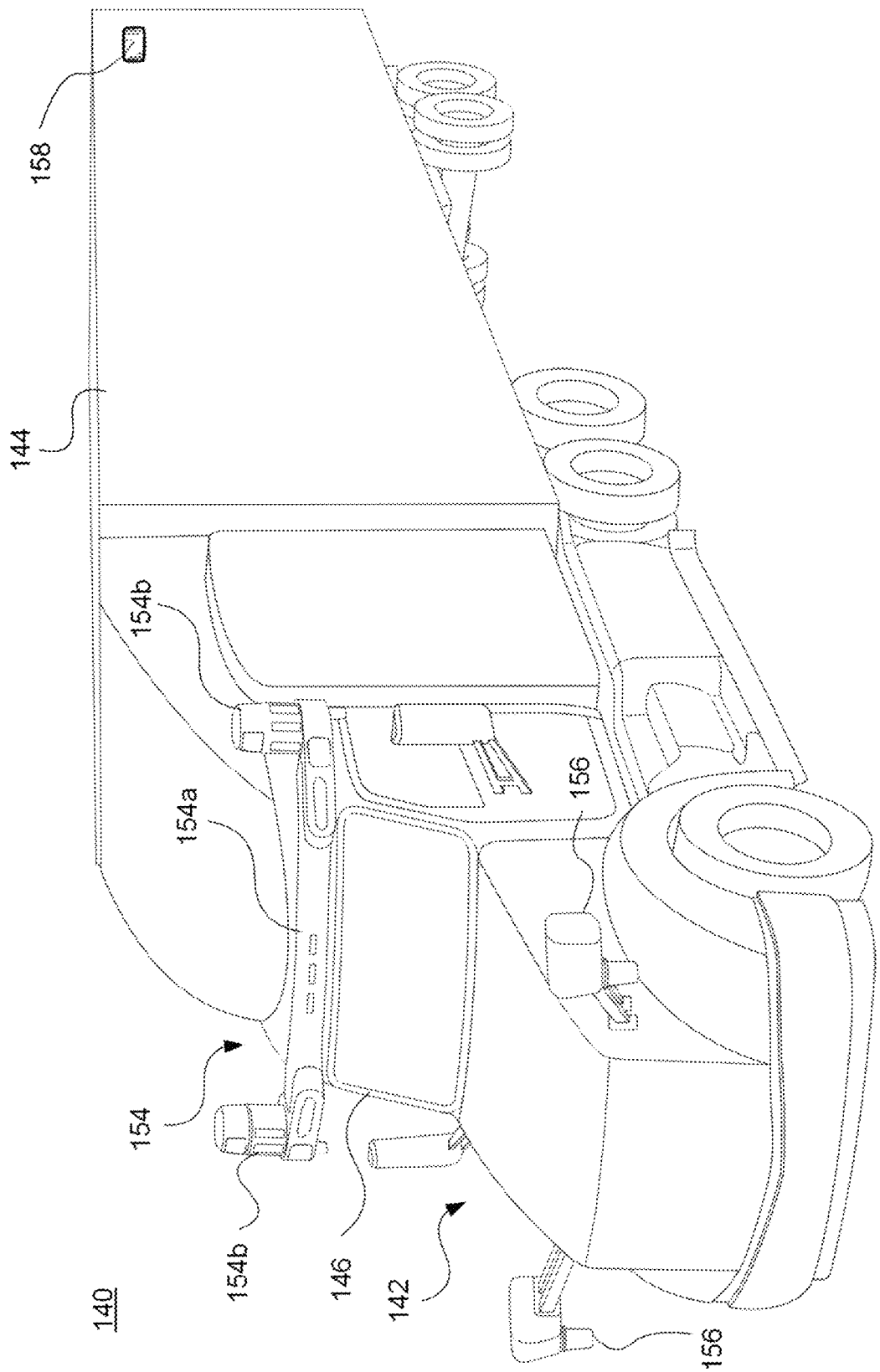

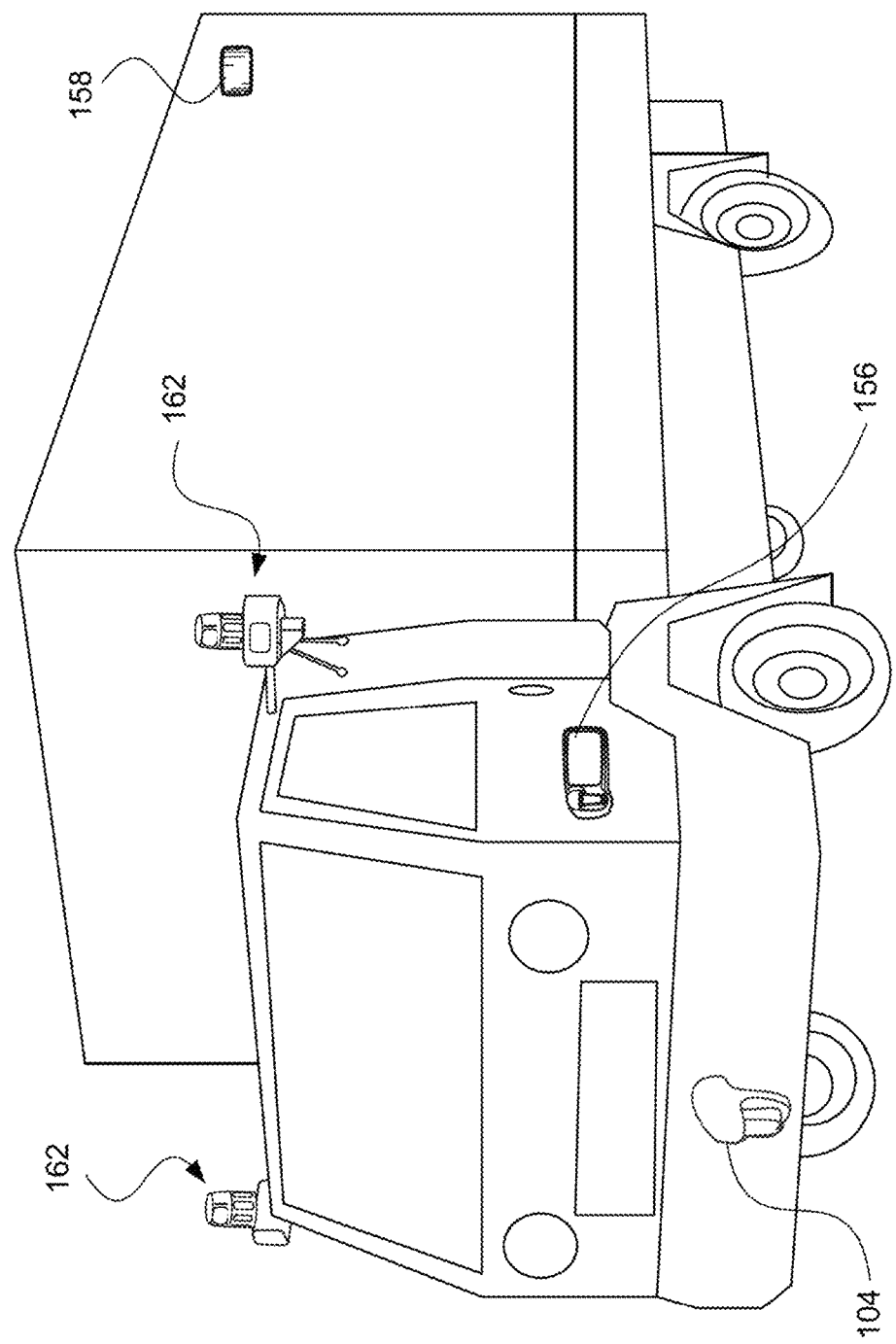

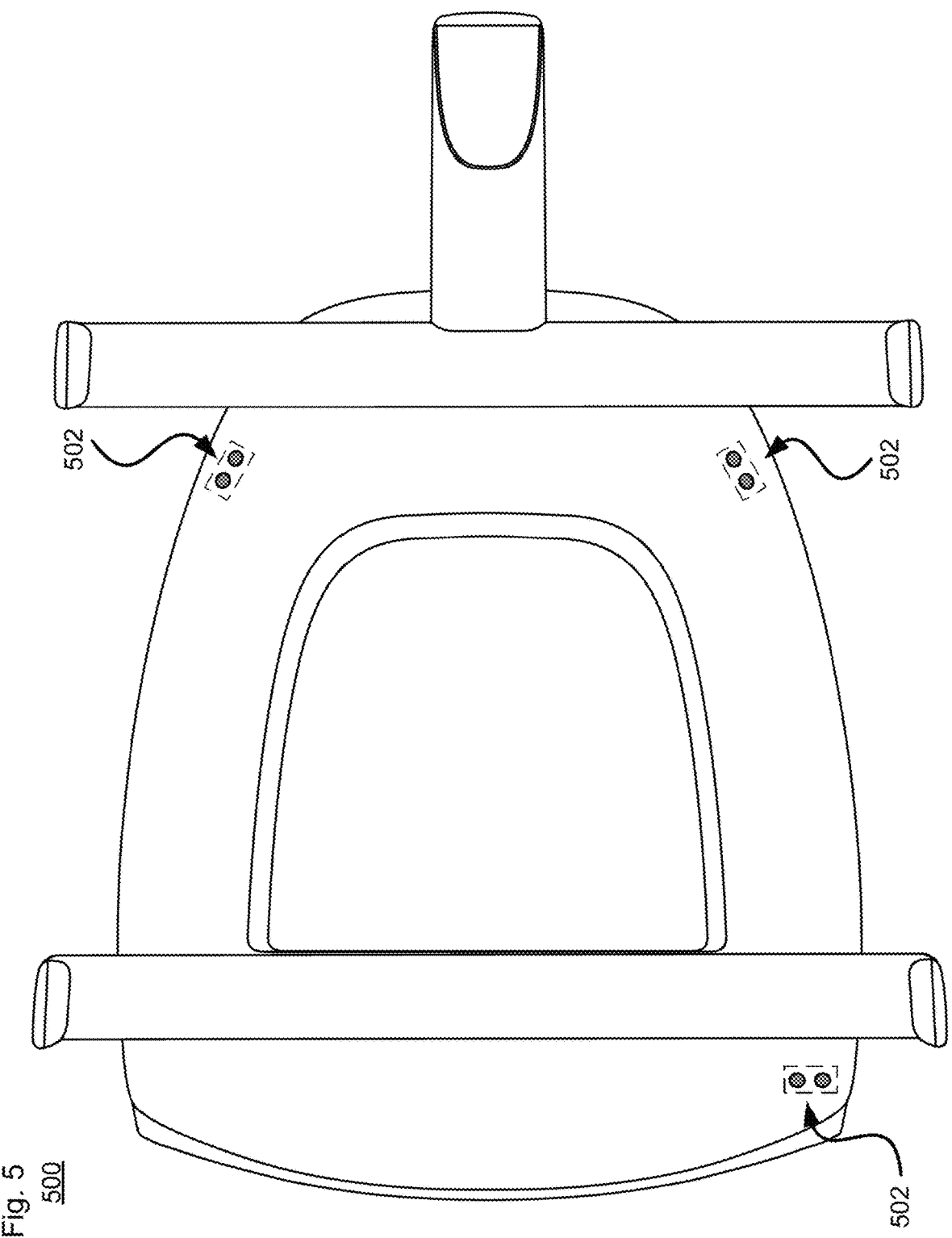

600

620

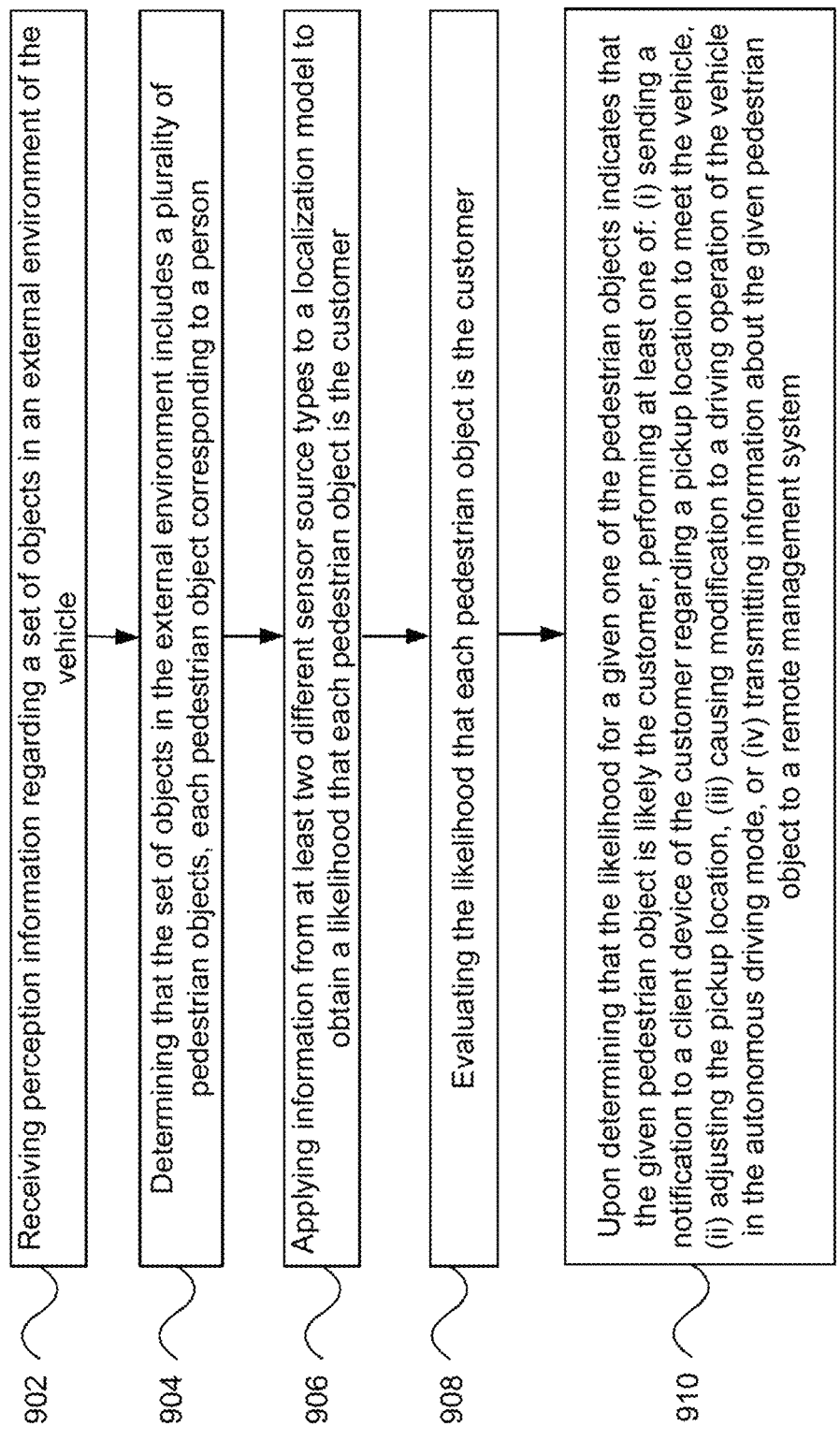

1000

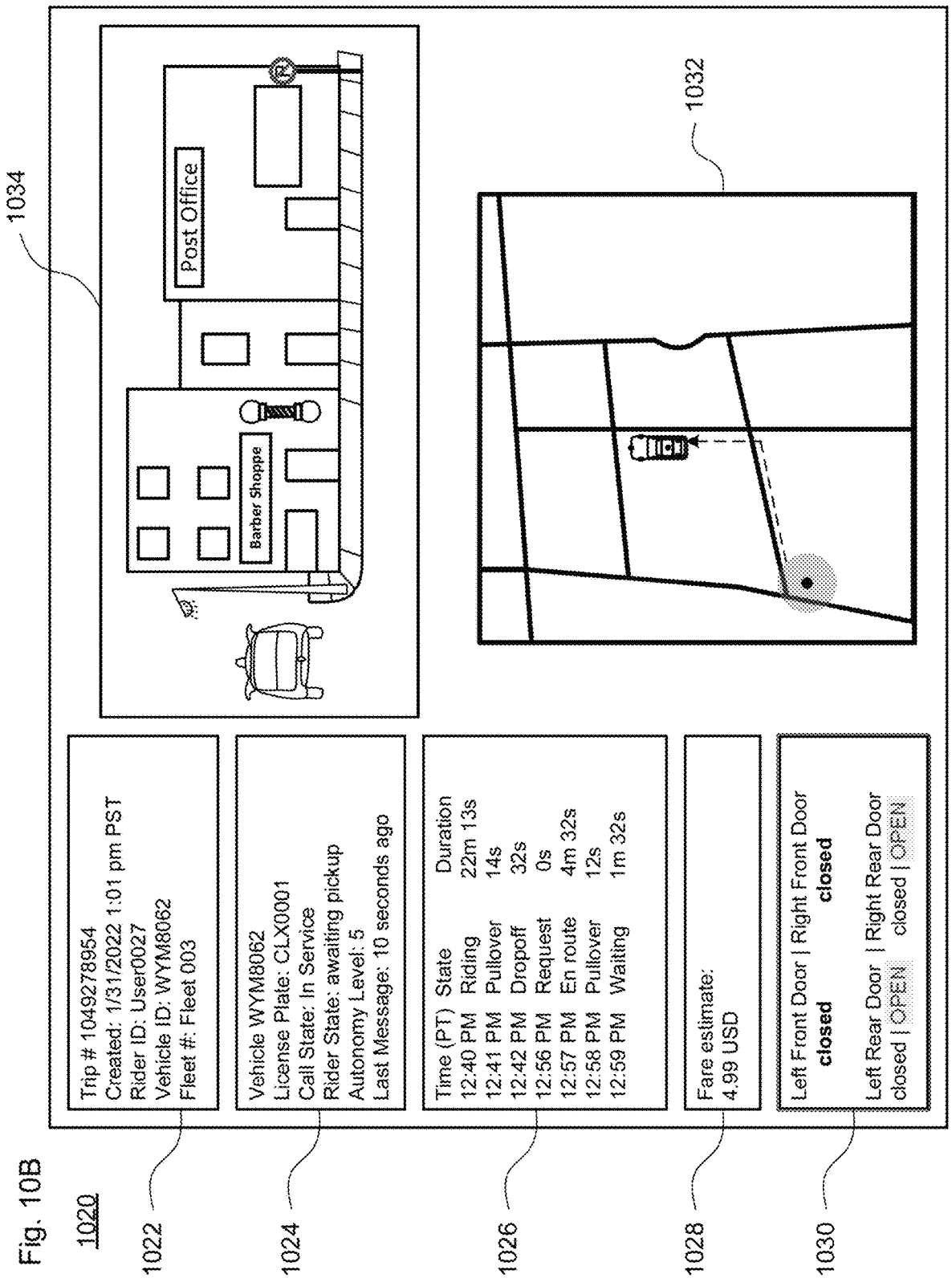

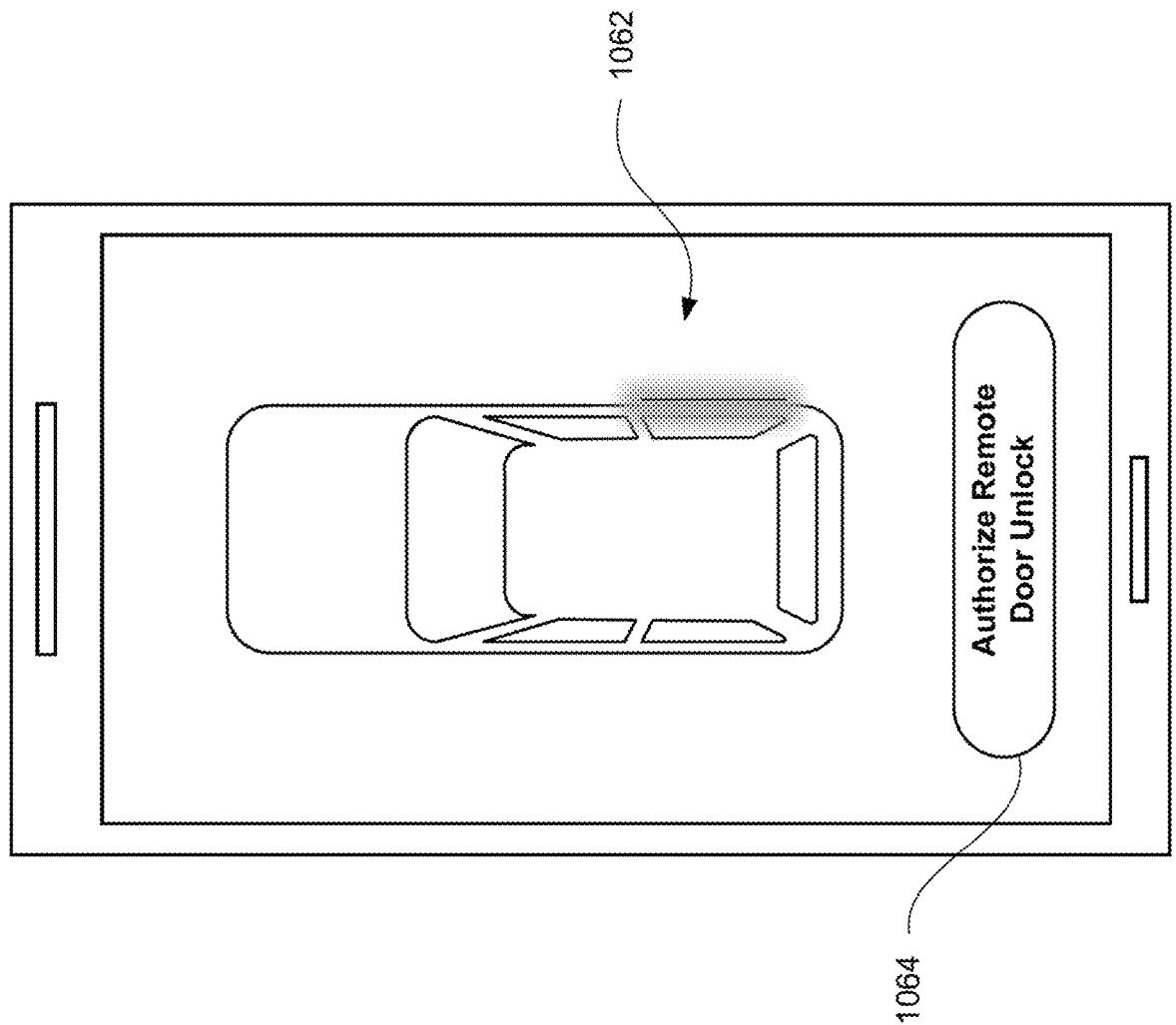

1100

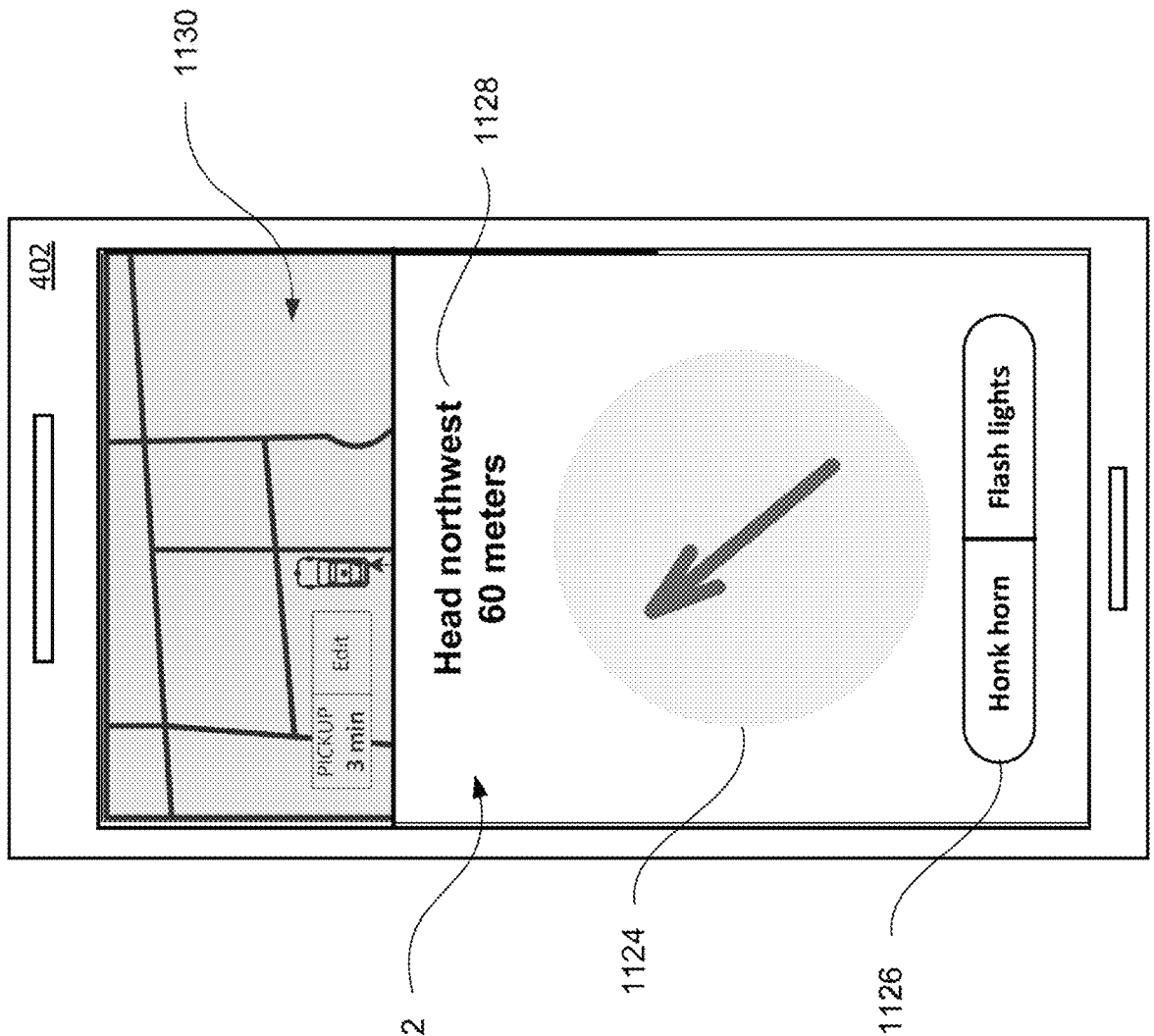

1150

1140

1180

1200

1220

1300

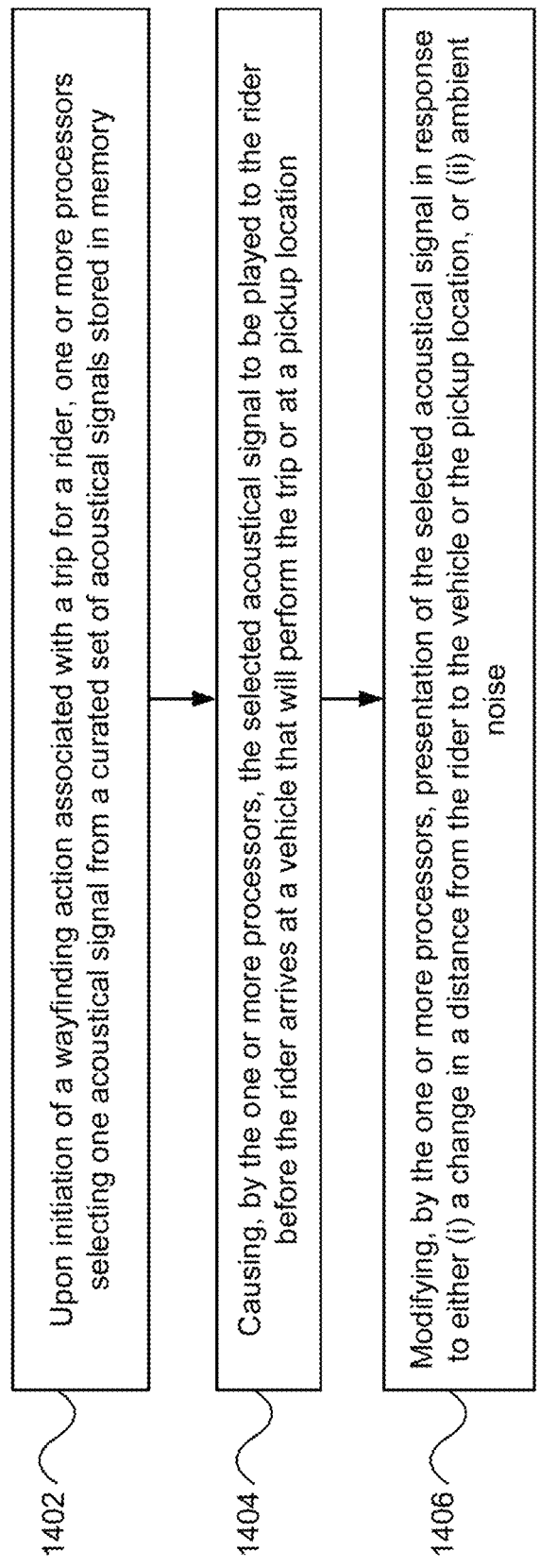

Fig. 14
1400

1402 — Upon initiation of a wayfinding action associated with a trip for a rider, one or more processors selecting one acoustical signal from a curated set of acoustical signals stored in memory 1404 — Causing, by the one or more processors, the selected acoustical signal to be played to the rider before the rider arrives at a vehicle that will perform the trip or at a pickup location 1406 — Modifying, by the one or more processors, presentation of the selected acoustical signal in response to either (i) a change in a distance from the rider to the vehicle or the pickup location, or (ii) ambient noise

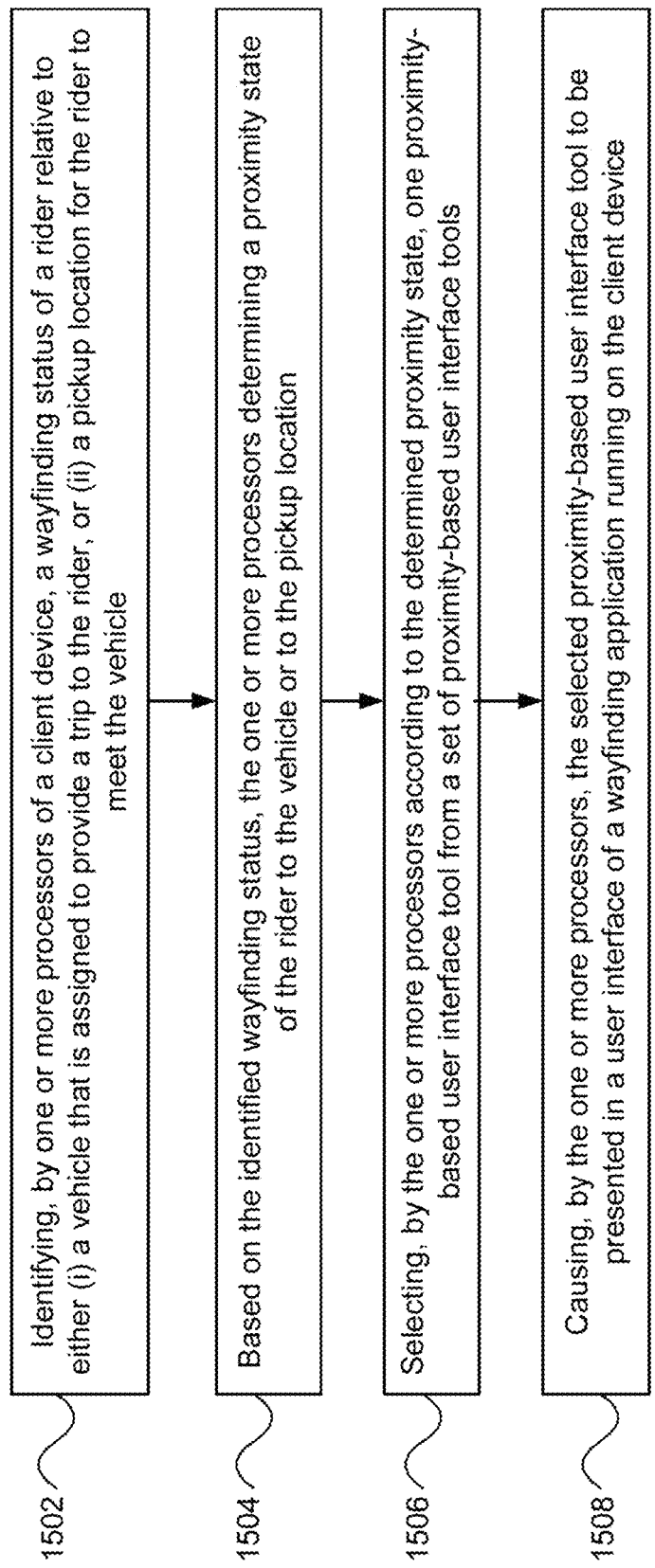

Fig. 15
1500

1502 — Identifying, by one or more processors of a client device, a wayfinding status of a rider relative to either (i) a vehicle that is assigned to provide a trip to the rider, or (ii) a pickup location for the rider to meet the vehicle 1504 — Based on the identified wayfinding status, the one or more processors determining a proximity state of the rider to the vehicle or to the pickup location 1506 — Selecting, by the one or more processors according to the determined proximity state, one proximity-based user interface tool from a set of proximity-based user interface tools 1508 — Causing, by the one or more processors, the selected proximity-based user interface tool to be presented in a user interface of a wayfinding application running on the client device

HOLISTIC AND INCLUSIVE WAYFINDING

CROSS-REFERENCE TO RELATED APPLICATIONS

This application claims the benefit of the filing date of U.S. Provisional Application No. 63/302,600, filed Jan. 25, 2022, the entire disclosure of which is incorporated by reference herein.

BACKGROUND

Autonomous vehicles, for instance, vehicles that may not require a human driver in certain driving situations, can be used to aid in the transport of passengers or items from one location to another. Such vehicles may operate in a fully autonomous mode where passengers may provide some initial input, such as a pickup or destination location, and the vehicle maneuvers itself to that location. Autonomous vehicles are equipped with various types of sensors in order to detect objects in the surroundings. For example, autonomous vehicles may include sonar, radar, camera, lidar, and other devices that scan, generate and/or record data about the vehicle's surroundings. This information is important for the vehicle's computing systems to make appropriate driving decisions for the vehicle. However, it may be challenging to identify which person in the vehicle's environment is the passenger to be picked up. This could adversely impact how the vehicle operates autonomously as it approaches a pickup location, and could result in miscommunication with the passenger or others in the vicinity. The passenger may also need assistance getting to or locating their vehicle.

BRIEF SUMMARY

The technology relates to a holistic and inclusive approach to passenger pickups and related wayfinding situations. This includes robust techniques for identifying where passengers are relative to the vehicle and/or the pickup location. Signal synthesis from different sensors, agent prediction, and situational awareness can be employed by the system to identify the likelihood that the passenger to be picked up is at a given location at a particular point in time, with sufficient confidence. Knowing this enables the system to provide adaptive navigation by helping passengers understand their distance and direction to the vehicle, for instance using visual, audible and/or haptic cues via an app on the person's device such as a mobile phone or smartwatch. These cues may include selected melodies, tunes or other piece of acoustic information that can be modified based on various factors such as ambient noise conditions, relative distance to the vehicle or pickup location, or sounds that are more recognizable cognitively to the rider.

Rider support tools may be provided, which enable a remote agent to interact with the passenger via that person's device, such as using the camera on the device to provide wayfinding support to enable the person to find their vehicle. Ride support may also use sensor information from the vehicle or a rider's client device when providing wayfinding support. This can include leveraging the camera(s) on the client device to obtain imagery of the rider's surroundings. Using this information, rider support personnel can guide the rider to the vehicle at the pickup location.

According to one aspect, a method is provided, which comprises: generating, by one or more processors of a rider support system, information about an autonomous vehicle trip for display on a rider support user interface, the information for display including a general trip information section, a vehicle information section, a map section and an imagery section; upon authorization to share imagery captured by a client device of a rider, receiving, by the one or more processors, the imagery captured by the client device; inserting, by the one or more processors, at least one still image or a video from the imagery into the imagery section of the rider support user interface; receiving via the rider support user interface, by the one or more processors from a rider support agent, wayfinding information regarding the autonomous vehicle trip; causing, by the one or more processors, transmission of the wayfinding information to the client device of the rider so that the wayfinding information is presentable to the rider via a user interface of the client device.

The map section may be configured to present map information to the rider support agent that encompasses map information presentable to the rider via the user interface of the client device. The wayfinding information may include a graphical change to the map information presentable on the user interface of the client device. The map section may be configured to present map information to the rider support agent that is different than map information presentable to the rider via the user interface of the client device. The wayfinding information may include verbal instructions to guide the rider to a pickup location of the autonomous vehicle, Generating the information about the autonomous vehicle trip may further include at least one of a state status section, a fare section or a vehicle access section.

According to another aspect, a method is provided that comprises: upon initiation of a wayfinding action associated with a trip for a rider, one or more processors selecting one acoustical signal from a curated set of acoustical signals stored in memory; causing, by the one or more processors, the selected acoustical signal to be played to the rider before the rider arrives at a vehicle that will perform the trip or at a pickup location; and modifying, by the one or more processors, presentation of the selected acoustical signal in response to either (i) a change in a distance from the rider to the vehicle or the pickup location, or (ii) ambient noise. The method may further comprise: generating, by the one or more processors, a preview of the selected acoustical signal; and causing, by the one or more processors, the preview of the selected acoustical signal to be played to the rider in response to the initiation of the wayfinding action.

The ambient noise may be detected in an environment adjacent to the vehicle. The ambient noise may be detected in an environment adjacent to the rider. Alternatively or additionally to the above, modifying the presentation of the selected acoustical signal in response to the ambient noise may include changing a pitch or tune of the acoustical signal.

According to yet another aspect, a method is provided that comprises: identifying, by one or more processors of a client device, a wayfinding status of a rider relative to either (i) a vehicle that is assigned to provide a trip to the rider, or (ii) a pickup location for the rider to meet the vehicle; based on the identified wayfinding status, the one or more processors determining a proximity state of the rider to the vehicle or to the pickup location; selecting, by the one or more processors according to the determined proximity state, one proximity-based user interface tool from a set of proximity-based user interface tools; and causing, by the one or more processors, the selected proximity-based user interface tool to be presented in a user interface of a wayfinding application running on the client device.

Each proximity-based user interface tool may have a different set of visual information to be presented to the rider that is based on the proximity state. The set of proximity-based user interface tools may include (i) a turn-by-turn directional tool, (ii) a compass-type directional tool, and (iii) a nearby directional tool. As the wayfinding status of the rider changes, the selected proximity-based user interface tool may automatically transition from either the turn-by-turn directional tool to the compass-type directional tool, or from the compass-type directional tool to the nearby directional tool. In an example, the selected proximity-based user interface tool cannot directly transition between the turn-by-turn directional tool and the nearby directional tool. Furthermore, the turn-by-turn direction tool may be selected when the rider is estimated to be more than 1 block from the vehicle or the pickup location. In this example, the compass-type directional tool is selected when the rider is estimated to be within 1 block from the vehicle or the pickup location but more than about 10 meters from the vehicle or the pickup location; and the nearby directional tool is selected when the rider is estimated to be less than 10 meters from the vehicle or the pickup location.

BRIEF DESCRIPTION OF THE DRAWINGS

FIGS. 1C-E illustrate example cargo and delivery type vehicles configured for use with aspects of the technology.

FIG. 5 illustrates a view of a sensor assembly in accordance with aspects of the technology.

FIG. 9 illustrates an example method in accordance with aspects of the technology.

FIGS. 10A-D illustrate features of rider support in accordance with aspects of the technology.

FIGS. 11A-E illustrate wayfinding features according to proximity states in accordance with aspects of the technology.

FIGS. 13-15 illustrate flow diagrams in accordance with aspects of the technology.

DETAILED DESCRIPTION

Figure 1A:
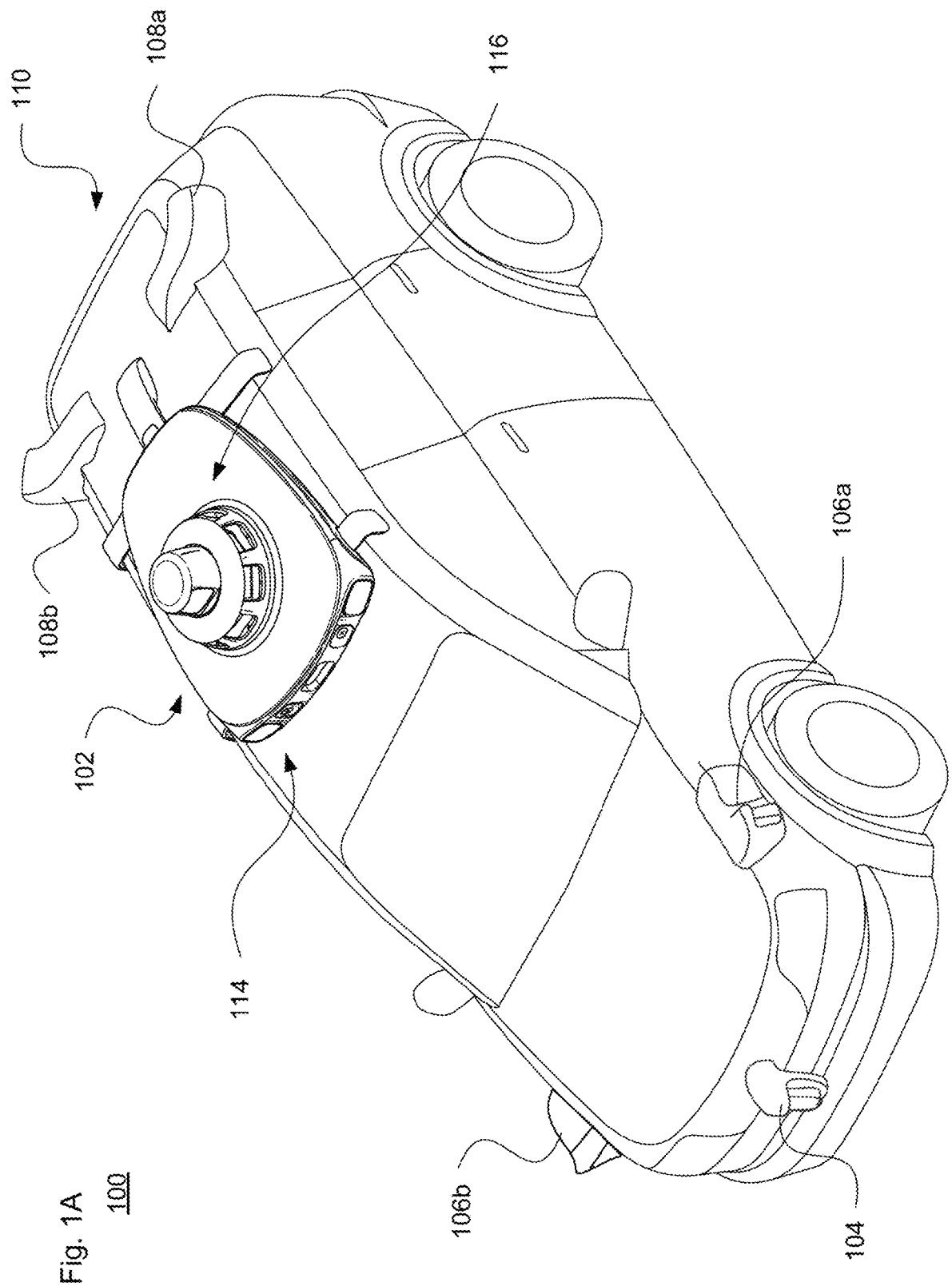
FIGS. 1A-B illustrate example self-driving vehicles in accordance with aspects of the technology.

Wayfinding in complex environments, such as dense urban areas or during rush hour, can be a challenge for people with and without disabilities, and is critical for riders of other customers using an autonomous vehicle service. A holistic approach according to aspects of the technology incorporates a broad set of features that work together to provide appropriate assistance to a diverse group of riders in a variety of situations. For instance, this allows autonomous vehicle riders with disabilities, such as blind or low vision riders, to quickly and easily find their vehicle at pickup and their destination at drop-off. As a result, the various wayfinding features can help to provide greater independence and freedom of mobility for these riders.

Autonomous vehicle systems consider safety, applicable traffic laws, and other constraints when selecting where the vehicle should pull over, and this can sometimes result in counterintuitive pickup and drop-off locations for the rider or other customer. For example, the vehicle may pull over farther down the road than expected, or behind a building, or on the opposite side of the street from the rider or the planned destination. Since the rider in a fully autonomous vehicle cannot communicate with an in-vehicle human driver or ask them to adjust the pullover, it can be inconvenient or challenging for the rider to find the vehicle or desired destination at pickup or drop-off. Furthermore, wayfinding can present a particular challenge for riders with vision and cognitive disabilities, but may also affect riders with hearing and ambulatory disabilities, riders with no disabilities at all, or even customers who are receiving a package or other delivery from the autonomous vehicle.

There can be various high-level needs for wayfinding to the vehicle at pickup or to the destination at drop-off. Examples of this include the following. Predictability: riders want to know where the vehicle will pull over and be aware of any potential wayfinding challenges ahead of time, before they encounter them. Proximity: riders may want the shortest possible walking distances to and from the vehicle (e.g., curbside pickup/drop-off), although a longer walking distance may be beneficial if it significantly helps pickup and/or drop-off ETA. Simplicity: riders may prefer fewer road users and obstacles to negotiate while wayfinding. Street crossings and large parking lots can be particularly difficult, while curbside can be easiest and/or safest to manage. For instance, avoiding the need to negotiate other road users and obstacles, and in particular crossing the street or navigating unpredictable large parking lots, may be a priority. Flexibility: riders may not want a one-size-fits-all approach, so different tools may be necessary for different needs in different situations for different riders. Patience: riders may want the vehicle to wait long enough at pickup for them to find it, especially when wayfinding may take additional time. Assistance: riders may want help to be available as a backup when they need it, but they may want to complete the wayfinding task independently.

One aspect of the technology leverages sensor information, e.g., camera imagery, from a rider's client device when providing rider support. This can include allowing a rider support agent to receive the imagery in order to help guide the rider to the vehicle's current or planned location. Another aspect involves audio information provided to the rider to help them get to the vehicle. This can include selecting or curating various tones or melodies, giving the rider advanced notice of which sounds to listen for, and modifying such sounds as the rider approaches the vehicle or to otherwise account for ambient noise in the immediate surrounding environment. In additional or alternatively, different wayfinding tools may be selected for presentation to the rider at different times, depending on how far or close they are to a pickup location or to the vehicle. Gracefully transitioning between different tools can enhance their usefulness and elevate the rider's experience for a trip.

According to a further aspect of the technology, the rider's location (e.g., based on information from their mobile phone or smartwatch) can be used by a backend services layer to understand the distance and direction from the rider to the car. This could be coupled with Bluetooth Low Energy (BLE) and/or other sensor recognition when the passenger is closer to the vehicle. Displaying the distance to the car as a text field within the app is straightforward in theory. However, having confidence in location and orientation accuracy is also important. For example, information regarding the distance to the vehicle may be provided with a granularity of yards instead of feet, to not imply higher accuracy than exists. Also, the system may place distance into "buckets" most appropriate for the current location accuracy, accompanied by some hysteresis heuristic that avoids rapidly cycling between distances. Similarly, generating appropriate haptic vibrations is a small technological challenge in a handheld device, but using them to effectively guide the user can be a large user design challenge. Linking out to turn-by-turn walking navigation in an existing consumer map app may be considerably more straightforward. However, certain map apps may not be optimized for autonomous vehicle use cases. For instance, if the vehicle needs to update its location after the rider has already shifted into the other app, there may be no efficient way to update the target location programmatically in that app's walking navigation.

There can be significant complexity to detecting the rider's proximity to the vehicle or a pickup location with a selected degree of confidence, as well as complexity in employing beneficial signals to play at the right time to assist in wayfinding. Thus, one aspect of the technology includes various techniques to identify the location of a given rider or other customer in real time. This can include synthesizing signals from different sensors of the vehicle, rider's device or other device, object prediction using behavior models and sensor information, as well as situational awareness that can provide contextual cues as to rider location. Having sufficient confidence in the real-time location of the rider allows the system to provide a rich variety of wayfinding information and assistance to the rider.

Example Vehicle Systems

Figure 1B:
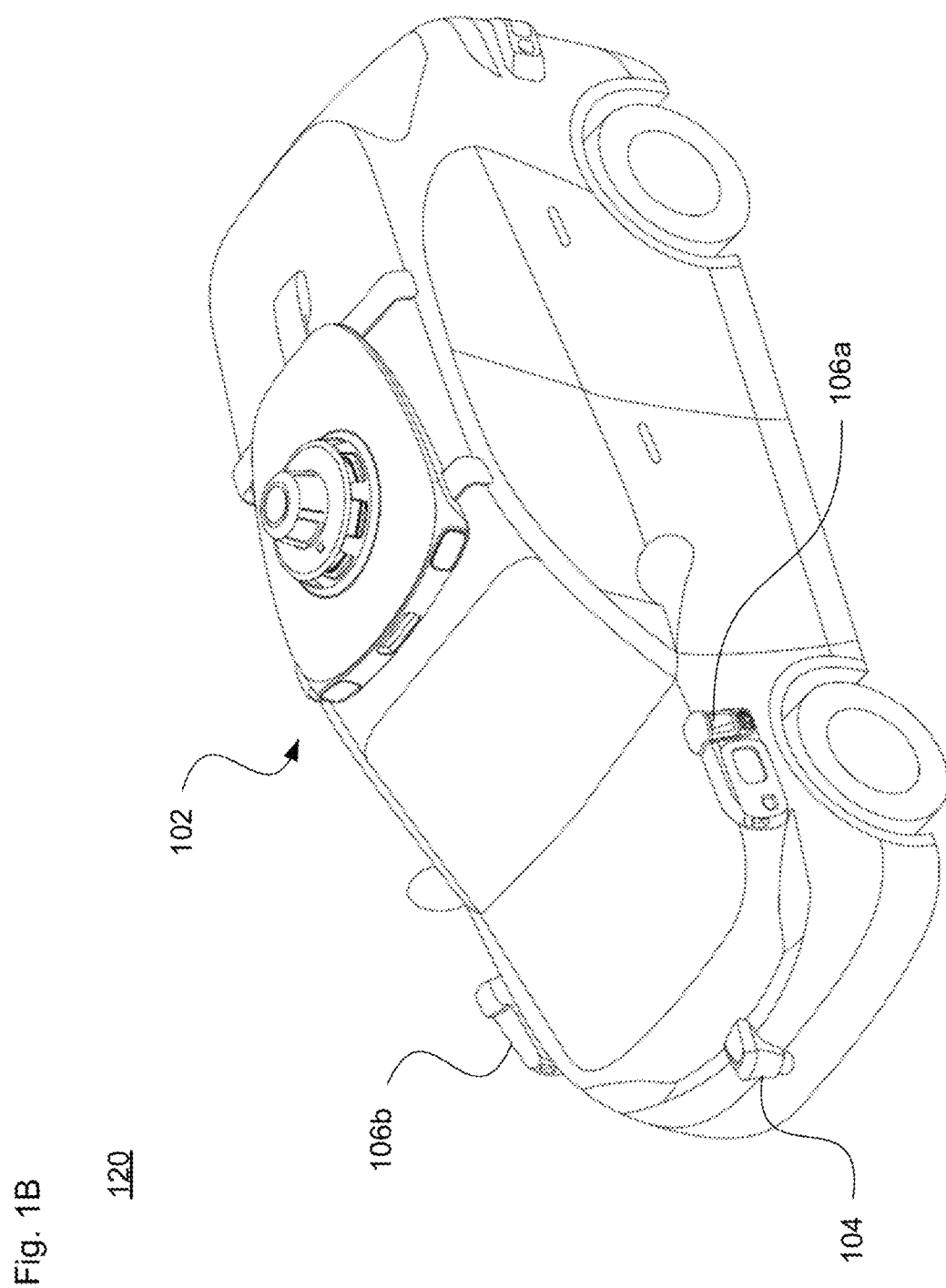
Figure 1D:
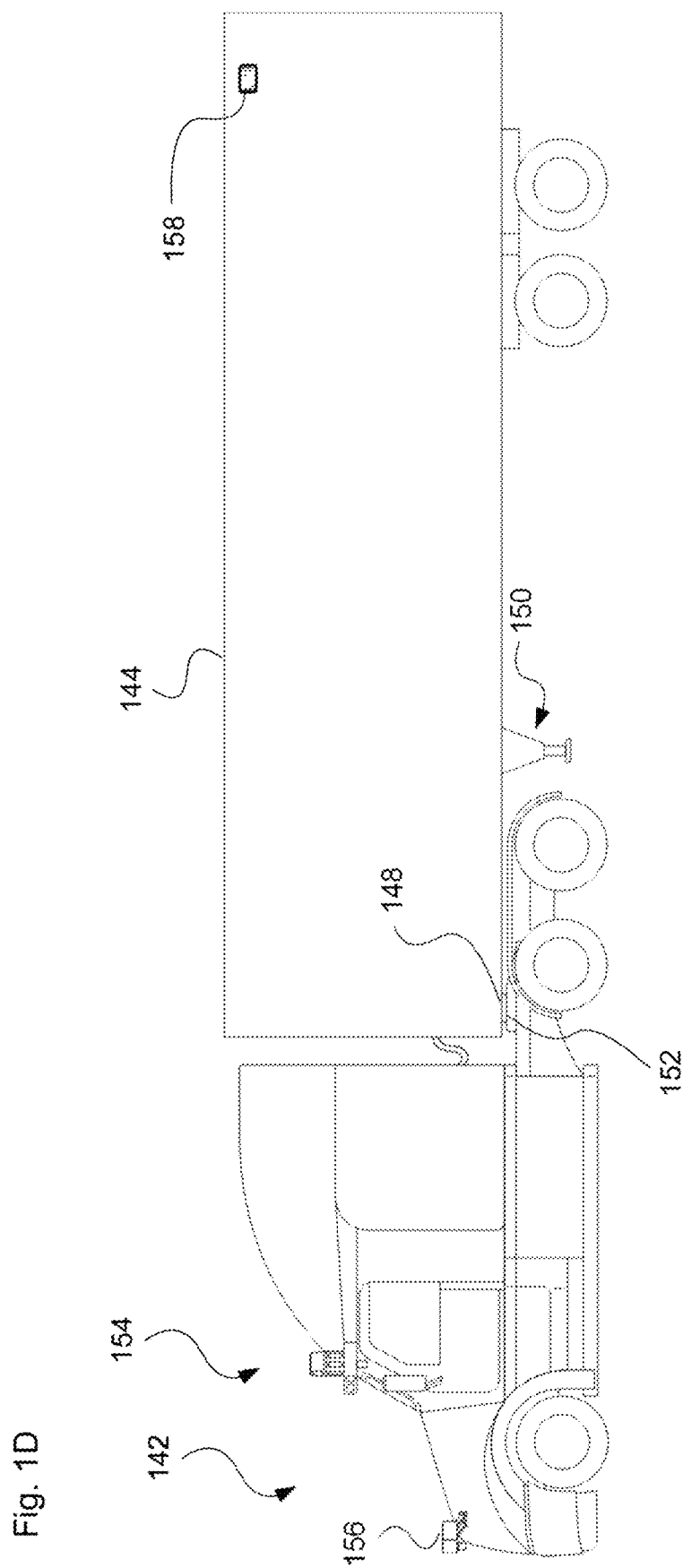

FIG. 1A illustrates a perspective view of an example passenger vehicle 100, such as a minivan or sport utility vehicle (SUV). FIG. 1B illustrates a perspective view of another example passenger vehicle 120, such as a sedan or crossover. The passenger vehicles may include various sensors for obtaining information about the vehicle's external environment. FIGS. 1C-D illustrate an example tractor-trailer type cargo vehicle 140. And FIG. 1E illustrates a smaller cargo vehicle 160, such as a panel truck for local deliveries.

Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified autonomy different levels to indicate how much, or how little, a vehicle controls the driving, although different organizations may categorize the levels differently. Moreover, such classifications may change (e.g., be updated) overtime.

As described herein, in a semi or partially autonomous driving mode, even though the vehicle assists with one or more driving operations (e.g., steering, braking and/or accelerating to perform lane centering, adaptive cruise control or emergency braking), the human driver is expected to be situationally aware of the vehicle's surroundings and supervise the assisted driving operations. Here, even though the vehicle may perform all driving tasks in certain situations, the human driver is expected to be responsible for taking control as needed. In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode. The technology may be employed in all manner of vehicles configured to operate in an autonomous driving mode, including vehicles that transport passengers or items such as food deliveries, packages, cargo, etc. While certain aspects of the disclosure are particularly useful in connection with specific types of vehicles, the vehicle may be any type of vehicle including, but not limited to, cars, vans, motorcycles, cargo vehicles, buses, recreational vehicles, emergency vehicles, etc.

For instance, as shown in FIG. 1A, the vehicle may include a roof-top housing unit (roof pod assembly) 102 may include one or more lidar sensors as well as various cameras (e.g., optical or infrared), radar units, acoustical sensors (e.g., microphone or sonar-type sensors, ultrasonic sensors, or the like), inertial (e.g., accelerometer, gyroscope, etc.) or other sensors (e.g., positioning sensors such as GPS sensors). Housing unit 102 may have any number of different configurations, such as domes, cylinders, "cake-top" shapes, etc. Housing 104, located at the front end of vehicle 100, and housings 106a, 106b on the driver's and passenger's sides of the vehicle may each incorporate lidar, radar, camera, acoustical and/or other sensors. For example, housing 106a may be located in front of the driver's side door along a quarter panel of the vehicle. As shown, the passenger vehicle 100 also includes housings 108a, 108b for, e.g., radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. Depending on the vehicle type and sensor housing configuration(s), acoustical sensors may be disposed in any or all of these housings around the vehicle.

In this example, arrow 114 indicates that the roof pod 102 as shown includes a base section coupled to the roof of the vehicle. And arrow 116 indicated that the roof pod 102 also includes an upper section (e.g., with the dome, cylinder or cake-top shape) raised above the base section. Each of the base section and upper section may house different sensor units configured to obtain information about objects and conditions in the environment around the vehicle. The roof pod 102 and other sensor housings may also be disposed along vehicle 120 of FIG. 1B. By way of example, each sensor unit may include one or more sensors of the types described above, such as lidar, radar, camera (e.g., optical or infrared), acoustical (e.g., a passive microphone or active sound emitting sonar-type sensor), inertial (e.g., accelerometer, gyroscope, etc.) or other sensors (e.g., positioning sensors such as GPS sensors).

The example cargo vehicle 140 of FIGS. 1C-D is a tractor-trailer truck. The truck may include, e.g., a single, double or triple trailer, or may be another medium or heavy-duty truck such as in commercial weight classes 4 through 8. As shown, the truck includes a tractor unit 142 and a single cargo unit or trailer 144. The trailer 144 may be fully enclosed, open such as a flat bed, or partially open depending on the type of goods or other cargo to be transported. In this example, the tractor unit 142 includes the engine and steering systems (not shown) and a cab 146 for a driver and any passengers.

As seen in the side view of FIG. 1D, the trailer 144 includes a hitching point, known as a kingpin, 148, as well as landing gear 150 for when the trailer is detached from the tractor unit. The kingpin 148 is typically formed as a solid steel shaft, which is configured to pivotally attach to the tractor unit 142. In particular, the kingpin 148 attaches to a trailer coupling 152, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 154 and 156 disposed therealong. For instance, sensor unit 154 may be disposed on a roof or top portion of the cab. The sensor unit 154 may be a sensor suite having an elongated central member 154a with one or more types of sensors located therealong (e.g., camera and/or radar modules) and side members 154b that may include other sensor types (e.g., short range lidar modules capable of detecting objects within 10-25 meters of the vehicle and/or long range lidar modules capable of detecting objects beyond 15-20 meters and up to 100-250 meters), Sensor units 156 may be disposed on left and/or right sides of the cab. Sensor units may also be located along other regions of the cab, such as along the front bumper or hood area, in the rear of the cab, adjacent to the fifth-wheel, underneath the chassis, etc. The trailer 154 may also have one or more sensor units 158 disposed therealong, for instance along one or both side panels, front, rear, roof and/or undercarriage of the trailer 154.

The perspective view 160 of FIG. 1E illustrates an example panel truck or other vehicle that may be suitable for local deliveries (e.g., groceries, meals, mail or other packages, etc.). Here, in contrast to the roof-top housing unit 154 shown in FIGS. 1C-D, the truck 160 may have a pair of sensor assemblies disposed in housings 162 on either side of the vehicle.

As with the sensor units of the passenger vehicles of FIGS. 1A-B, each sensor unit of the cargo vehicle may include one or more sensors, such as lidar, radar, camera (e.g., optical or infrared), acoustical (e.g., microphone or sonar-type sensor), inertial (e.g., accelerometer, gyroscope, etc.) or other sensors such as geolocation-based (e.g., GPS) positioning sensors, load cell or pressure sensors (e.g., piezoelectric or mechanical), inertial (e.g., accelerometer, gyroscope, etc.).

Figure 2:
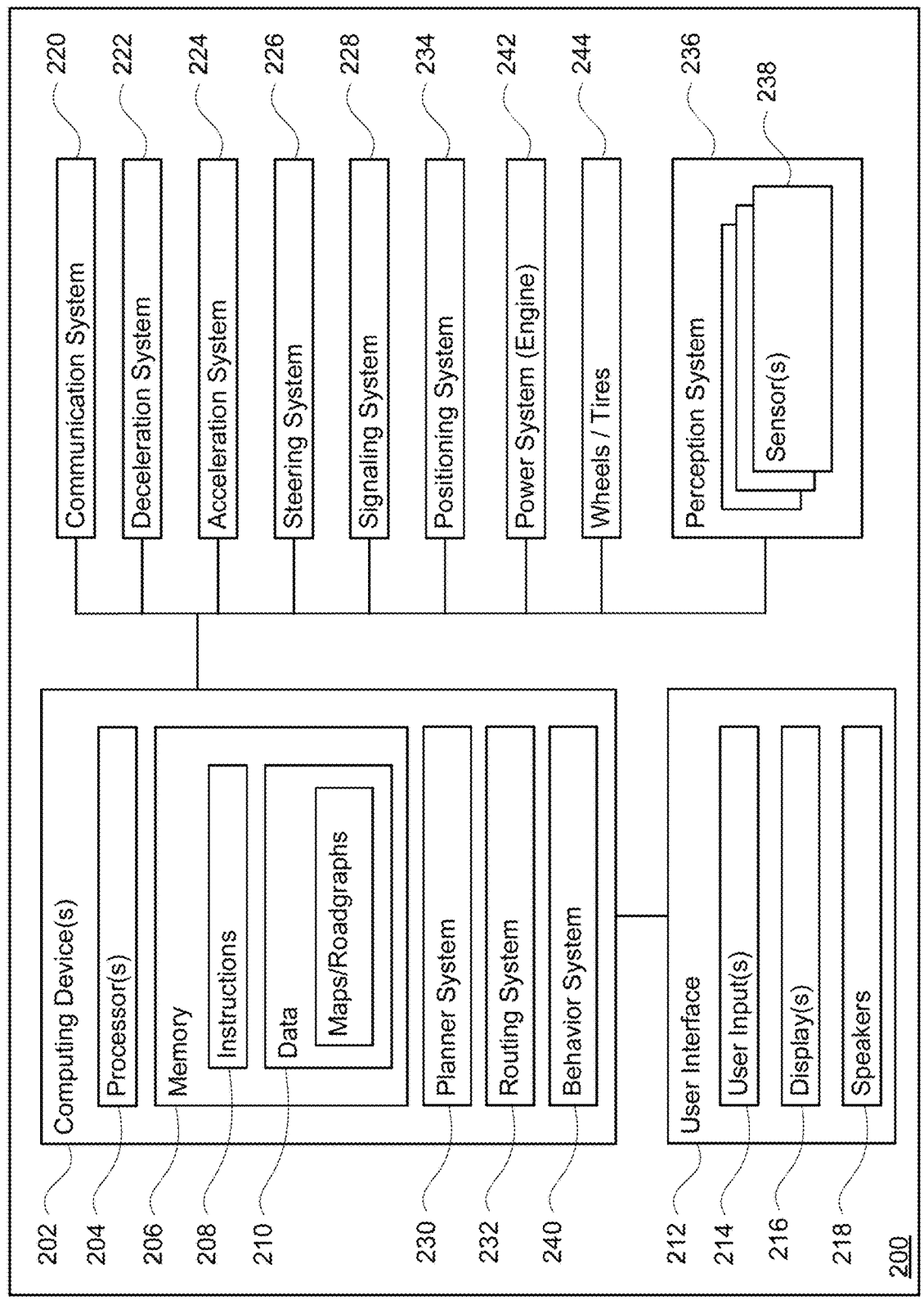
FIG. 2 illustrates components of a self-driving vehicle in accordance with aspects of the technology.

As shown in system diagram 200 of FIG. 2, the vehicle such as vehicle 100, 120 or 160 may have one or more computing devices, such as computing device 202 containing one or more processors 204, memory 206 and other components typically present in general purpose computing devices.

The memory 206 stores information accessible by the one or more processors 204, including and instructions 208 and data 210 that may be executed or otherwise used by the processor(s) 204. The memory 206 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 210 may be retrieved, stored or modified by processor 204 in accordance with the instructions 208. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 204 may be any conventional processors, such as commercially available CPUs, GPUs or TPUs. Alternatively, the one or more processors may include a dedicated device such as an ASIC or other hardware-based processor. Although FIG. 2 functionally illustrates the processor, memory, and other elements of computing device 202 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 202. Accordingly, references to a processor or computing device will be understood to include references to a collection of processors or computing devices or memories that may or may not operate in parallel.

Computing devices 202 may include all of the components normally used in connection with a computing device such as the processor and memory described above as well as a user interface 212 having one or more user inputs 214 (e.g., one or more of a button, mouse, keyboard, touch screen, gesture input and/or microphone), various electronic displays 216 (e.g., a monitor having a screen or any other electrical device that is operable to display information), and speakers 218 to provide information to a passenger of the autonomous vehicle or other people as needed. For example, electronic display 216 may be located within a cabin of autonomous vehicle 100, 120 or 160 and may be used by computing devices 202 to provide information to passengers or delivery personnel within the autonomous vehicle 100, 120 or 160.

Computing devices 202 may also include a communication system 220 having one or more wireless connections to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 202 may be part of an autonomous control system for the autonomous vehicle 100, 120 or 160 and may be capable of communicating with various components of the vehicle in order to control the vehicle in an autonomous driving mode. For example, computing devices 202 may be in communication with various systems of autonomous vehicle 100, 120 or 160, such as deceleration system 222, acceleration system 224, steering system 226, signaling system 228, planning system 230 (also referred to as a planning/trajectory module), routing system 232, positioning system 234 (for determining the position of the vehicle such as its pose, e.g., position and orientation along the roadway or pitch, yaw and roll of the vehicle chassis relative to a coordinate system), perception system 236 having one or more sensors 238, behavior modeling system 240 (also referred to as a behavior module), and power system 242 in order to control the movement, speed, etc. of autonomous vehicle 100, 120 or 160 in accordance with the instructions 208 of memory 206 in the autonomous driving mode.

As an example, computing devices 202 may interact with deceleration system 222 and acceleration system 224 in order to control the speed of the vehicle. Similarly, steering system 226 may be used by computing devices 202 in order to control the direction of autonomous vehicle 100, 120 or 160. For example, if autonomous vehicle 100, 120 or 160 is configured for use on a road, such as a car or truck, steering system 226 may include components to control the angle of wheels 244 to turn the vehicle. Some or all of the wheels/tires 244 are coupled to deceleration, acceleration and/or steering systems. The computing devices 202 may be able to receive information about tire pressure, balance and other factors that may impact driving in an autonomous mode. Computing devices 202 may also use the signaling system 228 in order to signal the vehicle's intent to other drivers or vehicles, for example, by lighting turn signals or brake lights when needed.

Routing system 232 may be used by computing devices 202 in order to generate a route to a destination using map information. Planning system 230 may be used by computing device 202 in order to generate short-term trajectories that allow the vehicle to follow routes generated by the routing system. In this regard, the planning system 230 and/or routing system 232 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device, as such as the computing devices discussed below or other computing devices), pullover spots, vegetation, or other such objects and information.

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g., latitude, longitude, altitude, etc.), an ending graph node having a specific geographic location (e.g., latitude, longitude, altitude, etc.), and a direction. This direction may refer to a direction the autonomous vehicle 100 must be moving in in order to follow the edge (i.e., a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 232 may use the aforementioned map information to determine a route from a current location (e.g., a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g., because it is faster) and therefore be preferable.

Positioning system 234 may be used by computing devices 202 in order to determine the vehicle's relative or absolute position on a map or on the earth. For example, the positioning system 234 may include a GPS receiver or to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of a roadgraph as well as relative location information, such as location relative to other cars immediately around it, which can often be determined with less noise than the absolute geographical location.

The positioning system 234 may also include other devices in communication with computing devices 202, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 236 includes one or more components (sensors 238) for detecting objects external to the vehicle such as other road users (vehicles, pedestrians, bicyclists, etc.) obstacles in the roadway, traffic signals, signs, trees, buildings, etc. For example, the sensors 238 of the perception system 236 may include lidar, sonar, radar, cameras, microphones (e.g., in an acoustical array for instance arranged along the roof pod 102), pressure or inertial sensors, strain gauges, and/or any other detection devices that generate and/or record data which may be processed by the computing devices of computing devices 202. In the case where the vehicle is a passenger vehicle such as a minivan 100 or car 120, the vehicle may include lidar, cameras, and/or other sensors mounted on or near the roof, fenders, bumpers or other convenient locations as shown in FIGS. 1A-B.

Such sensors of the perception system 236 may detect objects in the vehicle's external environment and their characteristics such as location, orientation (pose) relative to the roadway, size, shape, type (for instance, vehicle, pedestrian, bicyclist, etc.), heading, speed of movement relative to the vehicle, etc., as well as environmental conditions around the vehicle. The perception system 236 may also include other sensors within the vehicle to detect objects and conditions within the vehicle, such as in the passenger compartment or storage compartment (e.g., trunk). For instance, such sensors may detect one or more persons, pets, packages, etc., as well as conditions within and/or outside the vehicle such as temperature, humidity, etc. Still further, sensors 238 of the perception system 236 may measure the rate of rotation of the wheels 244, an amount or a type of braking by the deceleration system 222, and other factors associated with the equipment of the vehicle itself.

The raw data obtained by the sensors (e.g., camera imagery, lidar point cloud data, radar return signals, acoustical information, etc.) can be processed by the perception system 236 and/or sent for further processing to the computing devices 202 periodically or continuously as the data is generated by the perception system 236. Computing devices 202 may use the positioning system 234 to determine the vehicle's location and perception system 236 to detect and respond to objects and roadway information (e.g., signage or road markings) when needed to reach the location safely, such as by adjustments made by planner/trajectory module 230, including adjustments in operation to deal with sensor occlusions and other issues.

In some instances, object characteristics may be input into a behavior prediction system software module of the behavior modeling system 240 which uses various behavior models based on object type to output one or more predicted future behaviors for a detected object. Object trajectories may be a list of positions and orientations or headings (e.g., poses) as well as other predicted characteristics such as speed, acceleration or deceleration, rate of change of acceleration or deceleration, etc. In other instances, the characteristics obtained from the perception system 236 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted future behaviors, various likelihoods from detection system software modules, the map information identifying the vehicle's environment, position information from the positioning system 234 identifying the location and orientation of the vehicle, a destination location or node for the vehicle as well as feedback from various other systems of the vehicle may be input into a planning system software module of the planner system 230. The planner system 230 may use this input to generate trajectories for the vehicle to follow for some brief period of time into the future based on a route generated by a routing module of the routing system 232. In this regard, the trajectories may define the specific characteristics of acceleration, deceleration, speed, direction, etc. to allow the vehicle to follow the route towards reaching a destination. A control system software module of computing devices 202 may be configured to control movement of the vehicle, for instance by controlling braking, acceleration and steering of the vehicle, in order to follow a trajectory.

The computing devices 202 may control the vehicle in one or more of the autonomous driving modes by controlling various components. For instance, by way of example, computing devices 202 may navigate the vehicle to a destination location completely autonomously using data from the detailed map information and planner system 230. Computing devices 202 may use the positioning system 234 to determine the vehicle's location and perception system 236 to detect and respond to objects when needed to reach the location safely. Again, in order to do so, computing device 202 and/or planner system 230 may generate trajectories and cause the vehicle to follow these trajectories, for instance, by causing the vehicle to accelerate (e.g., by supplying fuel or other energy to the engine or power system 242 by acceleration system 224), decelerate (e.g., by decreasing the fuel supplied to the engine or power system 242, changing gears, and/or by applying brakes by deceleration system 222), change direction (e.g., by turning the front or rear wheels of autonomous vehicle 100, 120 or 160 by steering system 226), and signal such changes (e.g., by lighting turn signals) using the signaling system 228. Thus, the acceleration system 224 and deceleration system 222 may be part of a drivetrain that includes various components between an engine of the vehicle and the wheels of the vehicle. Again, by controlling these systems, computing devices 202 may also control the drivetrain of the vehicle in order to maneuver the vehicle autonomously.

Figure 3A:
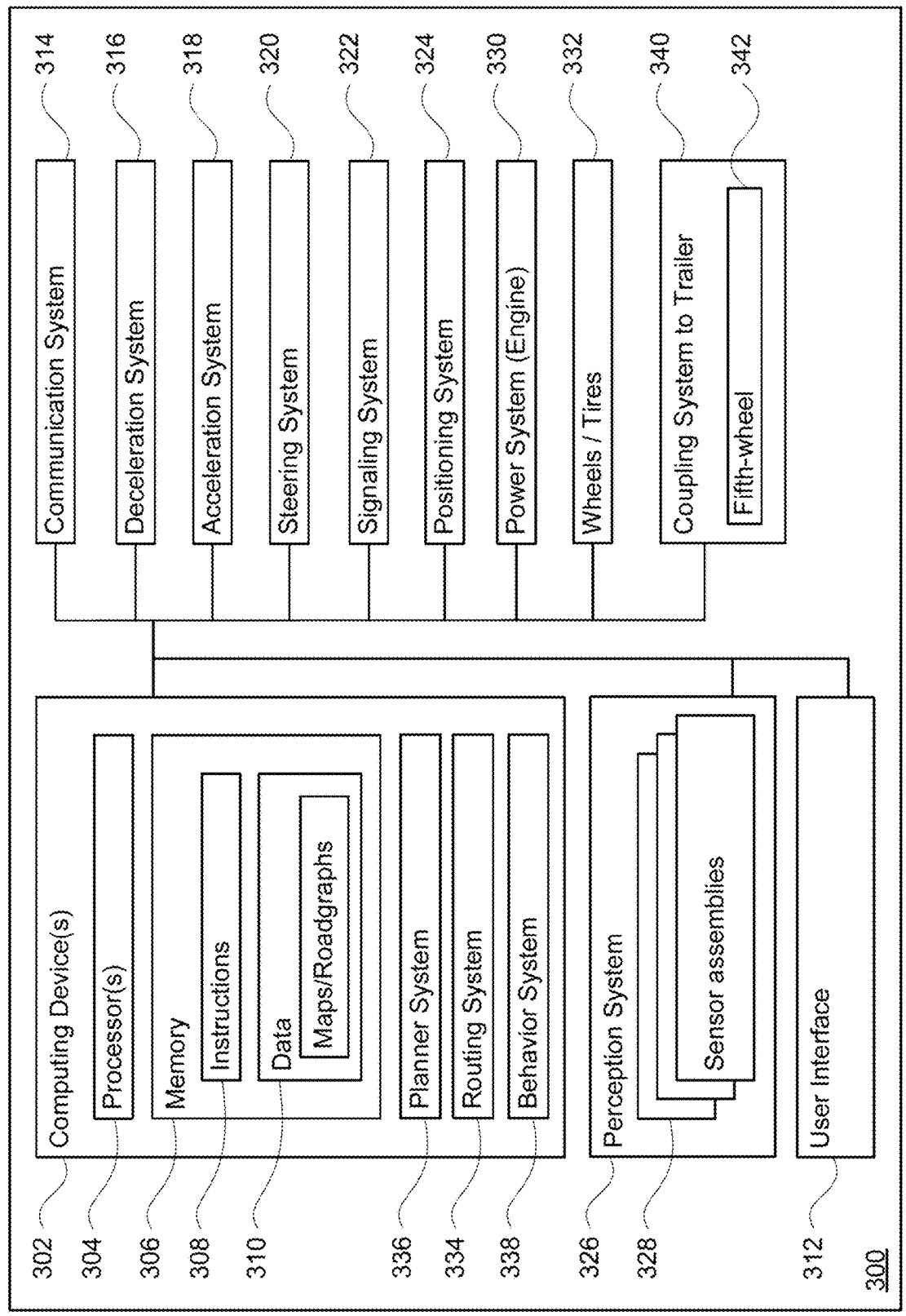
FIGS. 3A-B are block diagrams of systems of an example cargo-type vehicle in accordance with aspects of the technology.

FIG. 3A illustrates a block diagram 300 with various components and systems of a vehicle, e.g., vehicle 140 of FIGS. 1C-D. By way of example, the vehicle may be a truck, farm equipment or construction equipment, configured to operate in one or more autonomous modes of operation. As shown in the block diagram 300, the vehicle includes a control system of one or more computing devices, such as computing devices 302 containing one or more processors 304, memory 306 and other components similar or equivalent to components 202, 204 and 206 discussed above with regard to FIG. 2. For instance, the data may include map-related information (e.g., roadgraphs).

The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308. Here, as above, the system may include a user interface 312 having one or more user inputs, various electronic displays, and speakers.

In one example, the computing devices 302 may form an autonomous driving computing system incorporated into vehicle 140. Similar to the arrangement discussed above regarding FIG. 2, the autonomous driving computing system of block diagram 300 may be capable of communicating with various components of the vehicle in order to perform route planning and driving operations. Communication system 314 may provide one or more wireless connections in the manner described above for communication system 220. In addition or alternatively, the communication system may include the vehicle's internal communication bus (e.g., a Controller Area Network (CAN) bus or a FlexRay bus).

For example, the computing devices 302 may be in communication with various systems of the vehicle, such as a driving system including a deceleration system 316, acceleration system 318, steering system 320, signaling system 322, and a positioning system 324, each of which may function as discussed above regarding FIG. 2.

The computing devices 302 are also operatively coupled to a perception system 326 having one or more sensor assemblies 328, as well as a power system 330. Some or all of the wheels/tires 332 are coupled to the driving system, and the computing devices 202 may be able to receive information about tire pressure, balance, rotation rate and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information, routing system 334, planner system 336 and/or behavior system 338. For instance, computing devices 302 may employ a planner/trajectory module of the planner system 336 in conjunction with the positioning system 324, the sensor assemblies 328 of the perception system 326 and the routing system 334 to detect and respond to objects when needed to reach the location safely, similar to the manner described above for FIG. 2.

Similar to perception system 236, the perception system 326 also includes one or more sensors or other components such as those described above for detecting objects external to the vehicle, objects or conditions internal to the vehicle, and/or operation of certain vehicle equipment such as the wheels and driving system. Each sensor assembly 328 may include one or more sensors. In one example, a pair of sensor assemblies 328 may be arranged as sensor towers integrated into the side-view mirrors on the truck, farm equipment, construction equipment or the like. In another example, sensor assemblies 328 may also be positioned at different locations on the tractor unit 142 or on the trailer 144, as noted above with regard to FIGS. 1C-D. The computing devices 302 may communicate with the sensor assemblies located on both the tractor unit 142 and the trailer 144. Each assembly may have one or more types of sensors such as those described above.

Also shown in FIG. 3A is a coupling system 340 for connectivity between the tractor unit and the trailer. The coupling system 340 may include one or more power and/or pneumatic connections (not shown), and a fifth-wheel 342 at the tractor unit for mechanical connection to the kingpin at the trailer.

Figure 3B:
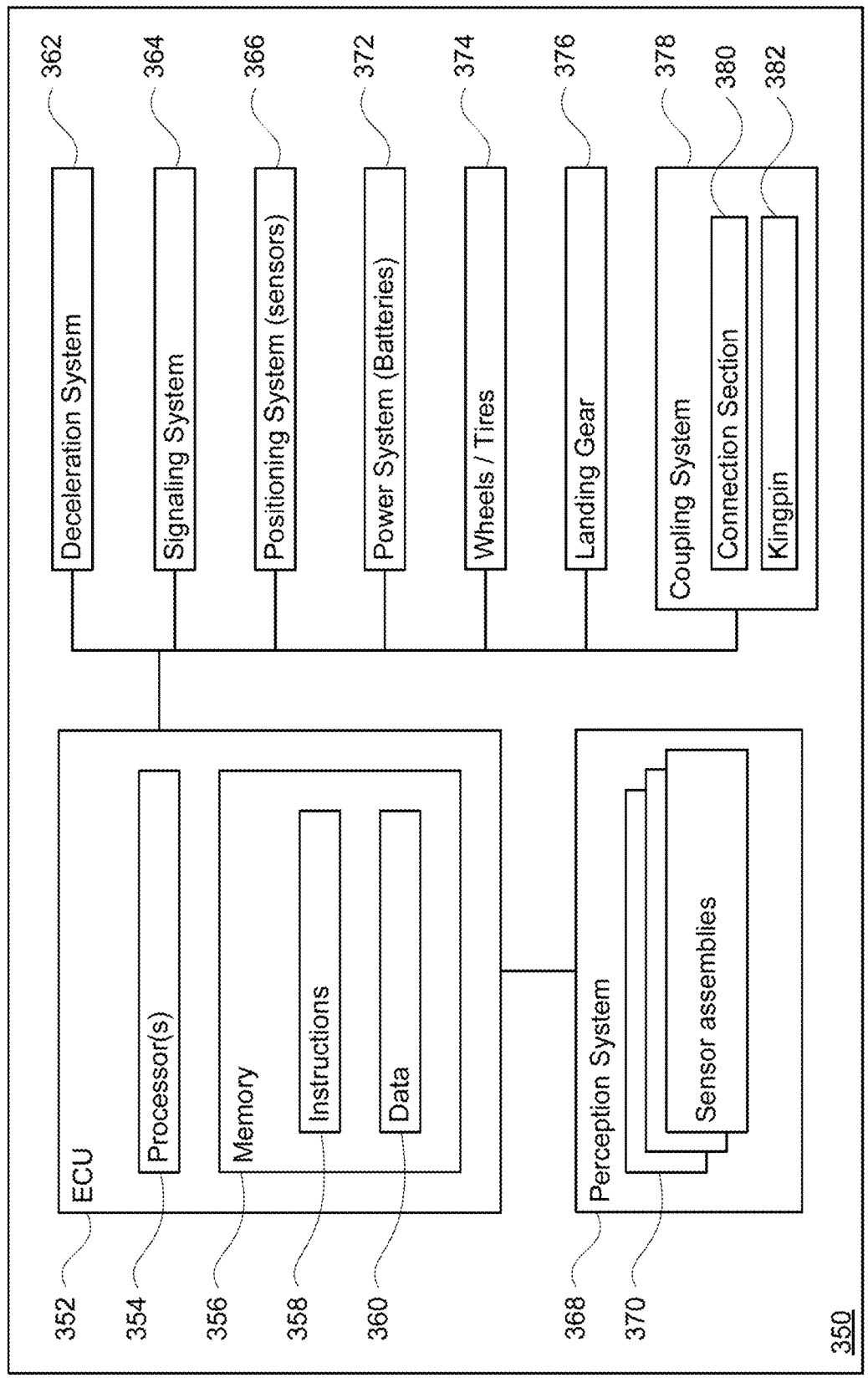

FIG. 3B illustrates a block diagram 350 of systems of an example trailer, such as trailer 144 of FIGS. 1C-D. As shown in this example, the system includes a trailer ECU 352 of one or more computing devices, such as computing devices containing one or more processors 354, memory 356 and other components typically present in general purpose computing devices. The memory 356 stores information accessible by the one or more processors 354, including instructions 358 and data 360 that may be executed or otherwise used by the processor(s) 354. The descriptions of the processors, memory, instructions and data from FIGS. 2 and 3A apply to these elements of FIG. 3B.

The trailer ECU 352 in this example is configured to receive information and control signals from the tractor unit, as well as information from various trailer components. The on-board processors 354 of the ECU 352 may communicate with various systems of the trailer, including a deceleration system 362, signaling system 364, and a positioning system 366. The ECU 352 may also be operatively coupled to a perception system 368 with one or more sensors arranged in sensor assemblies 370 for detecting objects in the trailer's driving environment. The ECU 352 may also be operatively coupled with a power system 372 (for example, a battery power supply) to provide power to local components. Some or all of the wheels/tires 374 of the trailer may be coupled to the deceleration system 362, and the processors 354 may be able to receive information about tire pressure, balance, wheel speed and other factors that may impact driving in an autonomous mode, and to relay that information to the processing system of the tractor unit. The deceleration system 362, signaling system 364, positioning system 366, perception system 368, power system 372 and wheels/tires 374 may operate in a manner such as described above with regard to FIGS. 2 and 3A.

The trailer also includes a set of landing gear 376, as well as a coupling system 378. The landing gear may provide a support structure for the trailer when decoupled from the tractor unit. The coupling system 378, which may be a part of coupling system 340 of FIG. 3A, provides connectivity between the trailer and the tractor unit. Thus, the coupling system 378 may include a connection section 380 (e.g., for communication, power and/or pneumatic links to the tractor unit). In this example, the coupling system also includes a kingpin 382 configured for connectivity with the fifth-wheel of the tractor unit.

Example Implementations

Figure 4A:
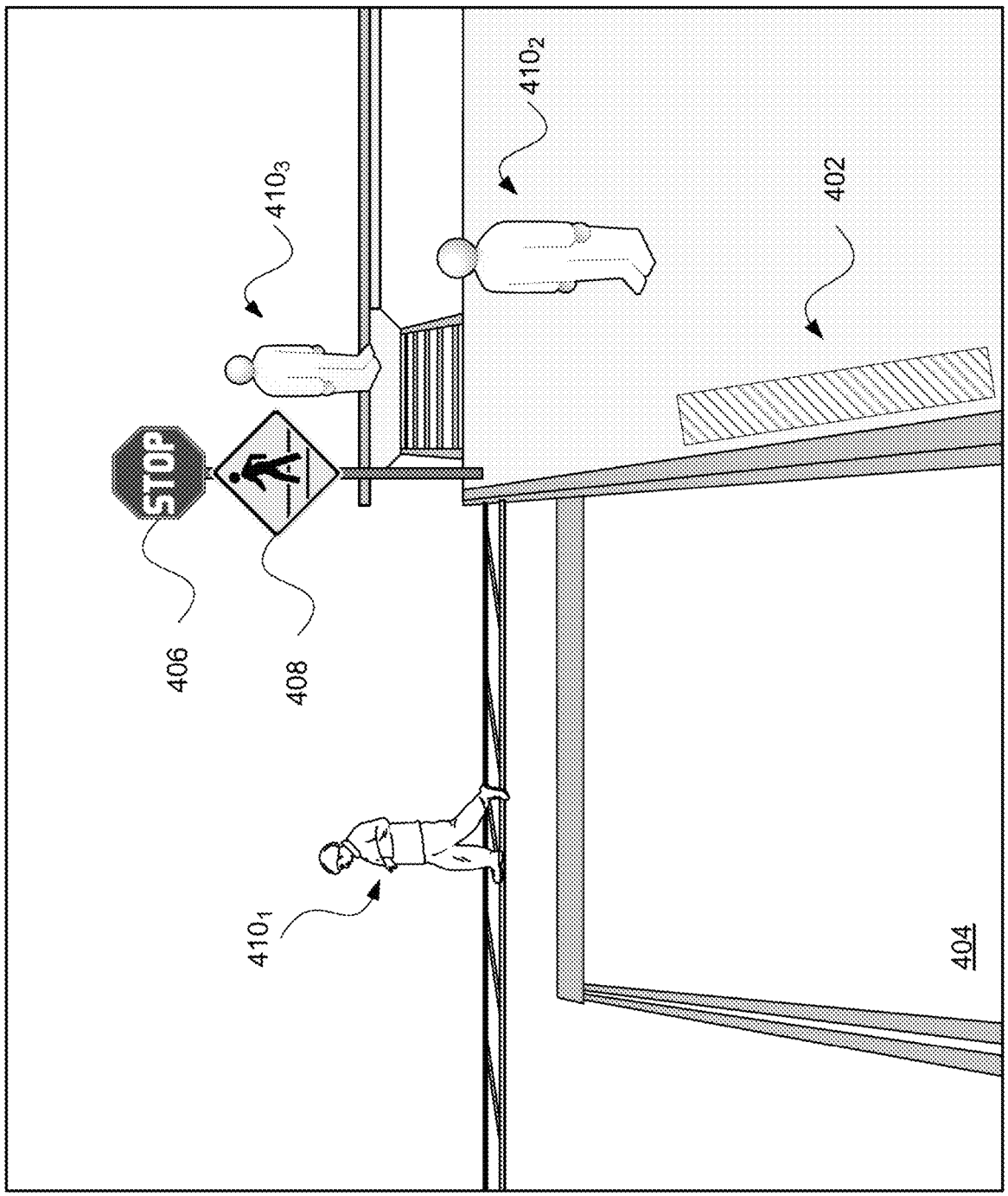
FIGS. 4A-B illustrate a pickup situation in accordance with aspects of the technology.

FIG. 4A is an example pickup situation 400, illustrating a pickup location 402 adjacent to a section of roadway 404. In this example, the pickup location 402 may be arranged when the rider to be picked up by an autonomous vehicle schedules a trip, for instance by using an app on their mobile phone or other device (e.g., tablet PC, smartwatch, etc.). The app may be used to schedule the trip with an autonomous vehicle ride hailing service. The person scheduling the trip may select the pickup location 402, which may be adjusted by the rider or the service prior to the actual pick up time.

The service may select which vehicle in a fleet is to pick up the rider. In this situation, the vehicle (not shown) approaches the pickup location 402. As it approaches, the vehicle may detect the presence of different objects on or adjacent to the roadway, including a stop sign 406 and a pedestrian crossing sign 408, as well as different people $410_1$, $410_2$ and $410_3$. In this example the detection is done using one or more sensors of the vehicle's perception system, such as lidar and/or camera sensors.

However, merely identifying the presence of people $410_1$-$410_3$ is likely insufficient in most situations to determine which person is the one to be picked up by the assigned vehicle. For instance, just because person $410_2$ is the one physically closest to the designated pickup location 402 does not mean that that is the rider. Or while person $410_1$ may be determined to have a walking path in the crosswalk away from the intersection, that does not necessarily mean that they are not the rider. Here, person $410_1$ may be walking around to the other side of the vehicle in order to enter it. And while person $410_3$ may appear to be facing away from the designated pickup location 402, that does not necessarily mean that they are moving in a direction away from it. Rather, they could be making sure there is no oncoming traffic before crossing the street.

Figure 4B:
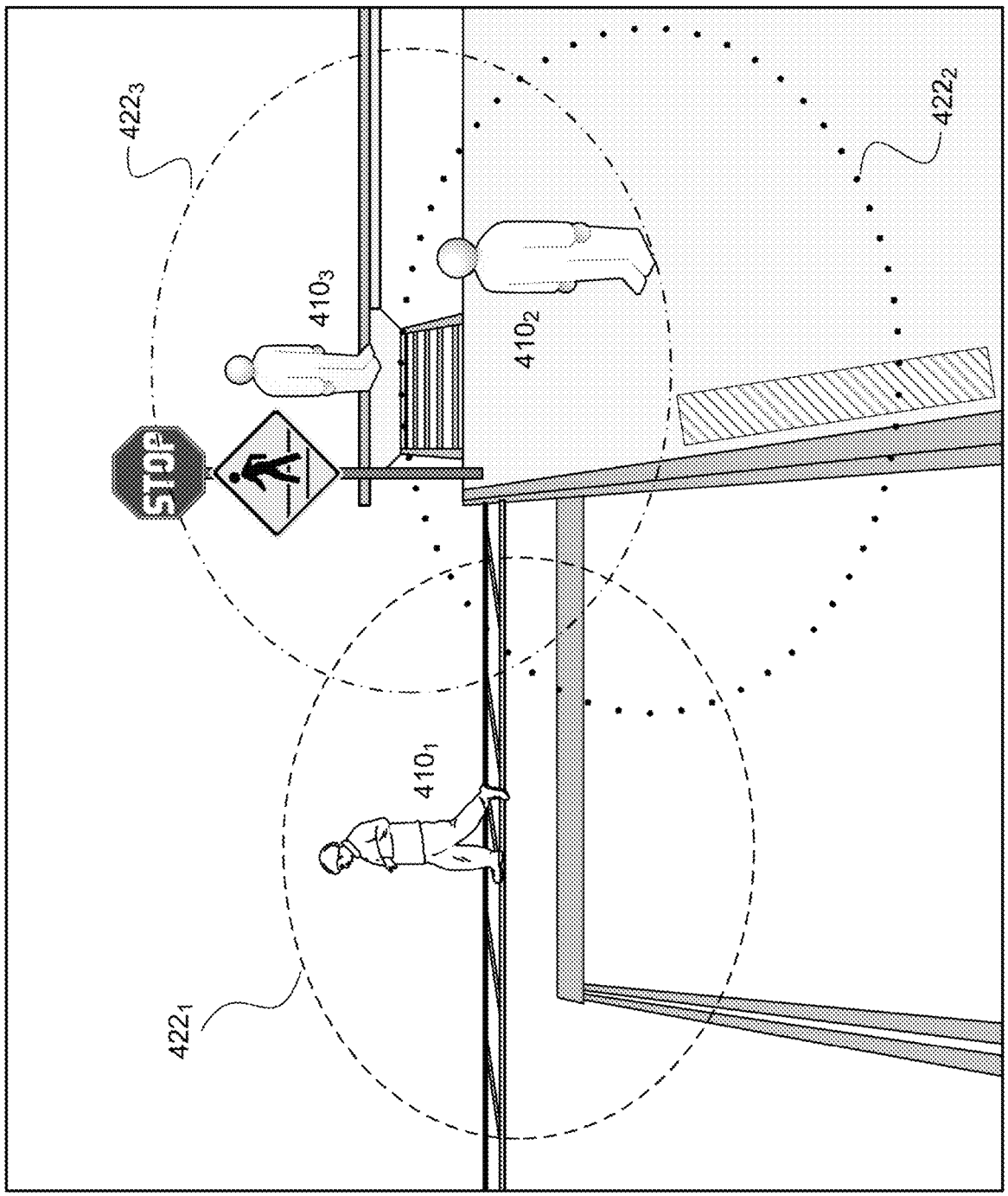

In some situations, location information from a client device of the rider can be used to identify where they currently are. This can often be useful to give an approximate position. The location information may be based on different sources (e.g., a global positioning system, WiFi or Bluetooth signals, cellular triangulation, etc.). Each source may have a limited granularity on the order of meters or tens of meters. The granularity of the location information may be adversely affected by tall obstructions such as skyscrapers or large trees with a dense leaf canopy, reflected radiofrequency (RF) signals, signal attenuation, etc. The result may be an approximate location encompassing some area of uncertainty. For instance, view 420 of FIG. 4B illustrates each person $410_1$-$410_3$ having an area of uncertainty $422_1$, $422_2$ or $422_3$ based on the location information from their respective client devices, as shown by the dashed, dotted or dash-dotted lines. As shown, the areas of uncertainty may overlap. Thus, if the system were using location information obtained by a client device and evaluating it in relation to imagery showing the different people 410 in the scene, it would likely not be accurate enough to allow the vehicle to determine which person is the rider.

In order to address these issues and achieve a high confidence that a person in the scene is the rider (e.g., 85%-90% or higher), the system may use additional information from different sensor sources. The sensor sources may include client device sources associated with the rider, vehicle sources that are onboard the vehicle including the perception system and positioning system, fleet sources obtained from other vehicles in the fleet, and/or other sources. The information from each source may be more or less helpful depending on a particular situation. The approach may include using a trained rider localization model to obtain a likelihood that a particular person is the rider. Other information can also be employed, for instance a visit history. Here, if a rider has previously visited a place several times and has a pattern of where they wait, such information in conjunction with the other factors describe can add confidence on locating/identifying the rider.

By way of example, client device sensor information may include positioning data from a GPS source, e.g., a GPS device integrated into a mobile phone, smartwatch or other wearable, tablet PC or the like. If location sharing is on, then the system may perform background polling for GPS coordinates, such as every few seconds (e.g., every 1-10 seconds). If sharing permissions are only when the app is open, then the GPS coordinates may only be received when the app is in the foreground (actively being used). And if there are no sharing permissions enabled, then GPS coordinates will not be shared. Other client device sensor information may include received signal strength information (RSSI) associated with WiFi signals or even ad hoc connections such as Bluetooth. In the case of WiFi signals, knowing which WiFi access points, repeaters or other devices are detectable by the client device and the relative signal strength can aid in determining how close the client device is to those devices. Similarly, knowing which Bluetooth devices are nearby can also help pinpoint the client device's location, especially if those Bluetooth devices are static (e.g., a wireless printer). By way of example, the system could use all such information to create a heat map or overlay of a geographical location, comparing the GPS coordinate information, RSSI information, other "visible" WiFi or Bluetooth devices to identify one or more likely spots where the client device could be. In one example, the vehicle may receive updated location or other information from the rider's client device every few seconds (e.g., every 1-5 seconds, or more or less). The refresh rate for receiving updated location information may be changed depending on the pickup status. For example, when the time is within 1-2 minutes of the scheduled pickup, the refresh rate could be increased to one or more times per second, whereas if the time is more than 5 minutes from the scheduled pickup, the refresh rate may be at a lower (e.g., default) rate of every 2-10 seconds (or more or less).

In addition to GPS information received from the rider's client device, the vehicle may also use location information from its onboard positioning system (e.g., 234 in FIG. 2). For instance, the vehicle's GPS receiver or other location systems can be used to determine the vehicle's latitude, longitude and/or altitude position. This information could be leveraged, such as by comparing the satellites detected by the rider's device with the satellites detected by the vehicle's GPS system. Having a common set (or subset) of satellites may indicate that the vehicle and the rider are positioned on the same side of the street. Or, conversely, the lack of overlapping satellites in the set could indicate that the rider is on the opposite side of the street or that some intervening obstruction is causing the two GPS modules to detect different satellites. In addition or alternatively, if the rider has multiple devices that each includes a GPS or other location module, information from each device could be used to refine the rider's location estimate (e.g., by averaging the locations from each module, or ranking the locations and selecting a most likely one). As a result, this information could be used to narrow the list of possible pedestrian candidates from a list of possible candidates detected by the vehicle's perception system.

As noted above, vehicle sources may include devices from the perception system and/or the positioning system. For instance, as discussed with regard to vehicle 100 of FIG. 1A and the diagram of FIG. 2, sensors of the perception system may include radar units, lidar units, cameras and acoustical sensors. The radar, lidar and/or cameras may each have a different field of view (e.g., a given camera may have a 45°-135° field of view along the front, side or rear of the vehicle, while a rotating lidar unit on the upper section of the roof pod 102 of FIG. 1A may have a 360° field of view), operating range (e.g., short range lidar configured to detect objects within 10-25 meters of the vehicle, long range lidar configured to detect objects beyond 15-20 meters and up to 100-250 meters, radar configured to detect objects 100-200 meters away or more, and high resolution cameras configured to detect pedestrian and signage at distances greater than 500 meters).

As shown in the bottom view 500 of FIG. 5, the roof pod assembly (102 in FIG. 1A) may include one or more sets of microphones 502. In particular, the bottom surface of the base section of the roof pod assembly may include locations for receptacles where microphones or other transducers 502 may be disposed. In one example, at least 3 or 4 locations, each having a pair of transducers (e.g., for localized noise cancellation), are employed in an acoustical system. Microphones or other transducers may be positioned along other parts of the vehicle. For directional microphones or other transducers, the system may have a higher confidence in the directionality and/or distance based on the relative orientation (e.g., parallel v. perpendicular). The transducers may be configured to detect sounds in a typical range of human hearing such as from 20 Hz to 20 KHz. The transducers may also be configured to detect sounds outside of this typical range, such as frequencies below 20 Hz (e.g., down to 1-15 Hz) or ultrasonic frequencies above 20 KHz (e.g., between 20 KHz-30 KHz).

This acoustical subsystem may be able to provide a certain amount of directional information for sounds detected in the vicinity of the vehicle. For instance, if the rider's device plays a tone or a short melody, the subsystem may detect which direction (bearing) it came from relative to the position and orientation (pose) of the vehicle along a roadway. Or the rider may be speaking to remote assistance personnel via an app, such as to get assistance locating the vehicle or the pickup location. By way of example, the subsystem may be able to detect that the sound came from a bearing in the range of 120°-140° relative to the front of the vehicle. A distance from the source of the sound to the vehicle may also be estimated, for instance if the rider's device communicates the volume of sound to the vehicle (e.g., either the sound level emitted when the tone or melody is played, or the sound level detected when the person is speaking to remote assistance). Here, knowing the loudness of the sound at the rider's device and the loudness of the detected sound, the vehicle's system may estimate the approximate distance according to a sound distance attenuation calculation (e.g., within 25 meters, between 25-5 meters, beyond 50 meters, etc.). Knowing an estimated bearing and distance from the microphones or other transducers, the system may use this to focus in on one or more pedestrian objects detected by the other onboard sensors. In another example, the rider's phone may ping or emits a signal that the vehicle's acoustical subsystem detects and then echo's back, which can be used to indicate to the rider how close they are to the vehicle based on the time it takes for the ping and echo process to occur. This information can be communicated to the rider via tactile information such as one or more haptic patterns, etc. The ping and echo tones can be ultrasonic rather than within the range of human hearing. The length or pattern of 'tone' can be used to inform the rider how far/close they might be to the vehicle (or the pickup location), In combination with imagery detected by one or more cameras on the vehicle, such a ping/echo approach with feedback may help to further pinpoint and direct the rider towards the vehicle;

Alternatively or additionally to the above, the acoustical subsystem may detect current ambient noise in the vehicle's nearby environment, such as within 25 to 100 meters of the vehicle. The information obtained by this subsystem can be used to identify "noisy" audio frequencies, or specific types of noises (e.g., sirens from emergency vehicles, honking horns, construction equipment, etc.). Based on this identification, the vehicle, backend management system or the rider's client device may select a tone, melody or other audio identifier to be played that avoids such noisy frequencies or types of noises, or would otherwise be readily perceivable by the rider notwithstanding such noise. Aspects of this are discussed further below.

The communication system (e.g., 200 in FIG. 2) may also provide additional sources based on Bluetooth, WiFi and/or cellular information detected by the vehicle. For instance, Bluetooth and WiFi RF signals may have an effective range of meters to several hundred meters, while cellular signals may have an effective range on the order of kilometers or more from the base station or gNodeB. In the case of a Bluetooth or other ad hoc type of connection, once a connection has been established between the rider's device and the vehicle, signal strength information (from the rider's device and/or the vehicle) can help in refining the location estimate for the rider. Alternatively or additionally, the presence of other Bluetooth or WiFi enabled devices detected by the rider's device may be shared with the vehicle. Here, the vehicle's system may compare the list of such devices with its own detected device list. If there are devices in common on each list, this can further narrow down the likely position of the rider's device, especially when the devices on the list have a known location. A similar evaluation could be performed for cellular signals, for instance by comparing which base stations/gNodeBs (or sectors of those devices) are on the lists. These analyses may be performed with or without considering signal strength information.

Figure 6A:
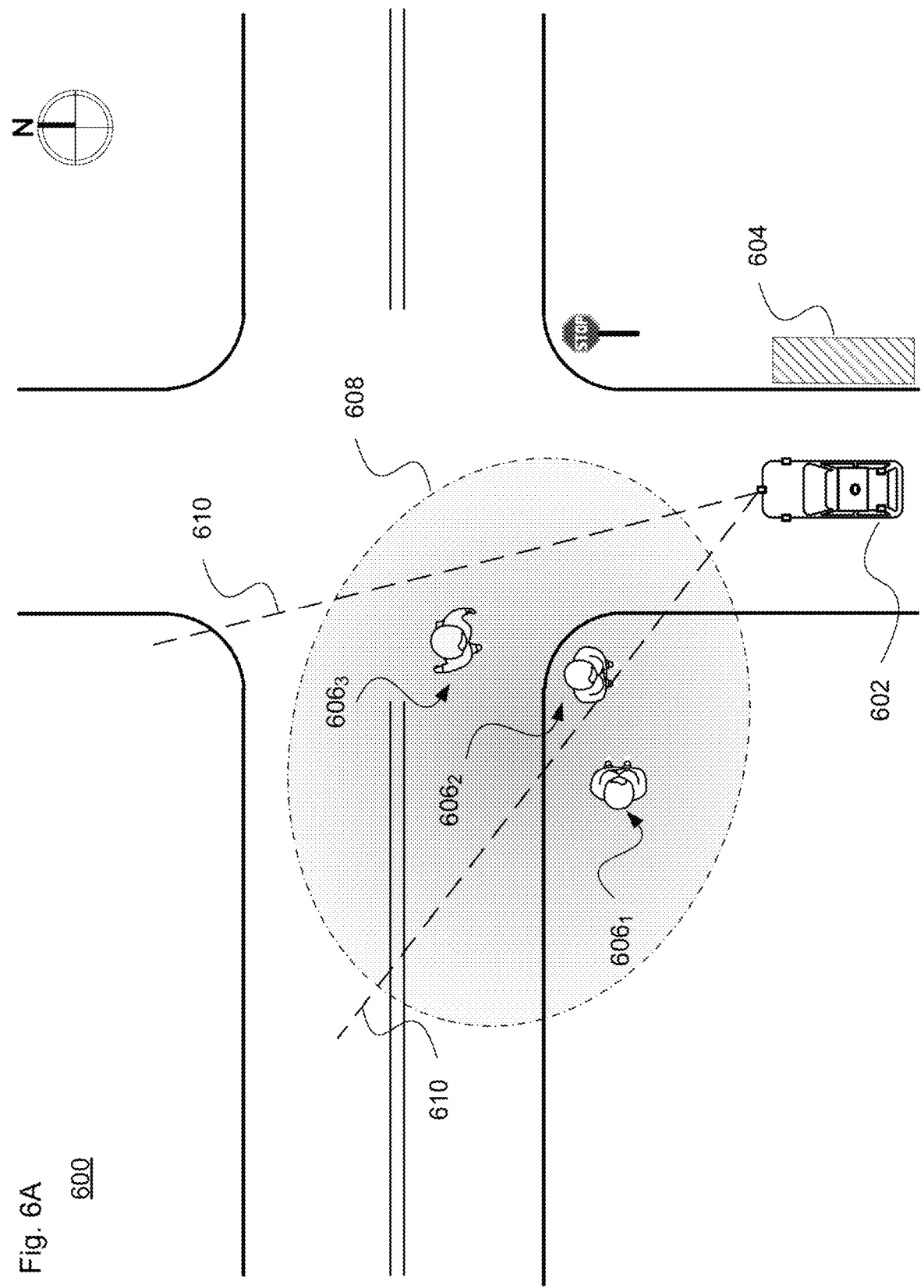
FIGS. 6A-B illustrate examples for rider pickups in accordance with aspects of the technology.

In combination, such obtained or detected information may be used to identify a specific person in the environment who is highly likely to be the rider, or to eliminate other pedestrians from a list of potential riders. For instance, FIG. 6A shows an example scene 600, in which vehicle 602 has arrived at pickup location 604. In this example, three objects in the nearby environment have been identified as pedestrians, namely pedestrian objects $606_1$, $606_2$ and $606_3$. Based on location information provided by the rider's client device, dashed area 608 indicates a zone within which the rider is likely to be, e.g., with a 95% likelihood. However, this zone encompasses all three pedestrian objects detected by the vehicle's perception system. Using one or more pieces of information from the vehicle's systems as discussed above, the vehicle may determine that the rider is within an area bounded by the straight dashed lines 610. This enables the system to eliminate pedestrian object $606_1$ as the rider to be picked up. Other information may be used to further refine the list of possible riders or otherwise identify a single rider candidate with the highest confidence value. This can include a triangulation-type approach, where each different source of information can be used to narrow down the area in which the rider could be. Note that in different situations it may not be necessary to know exactly which of the pedestrians is the rider, as long as there is a determination that the rider is one of a specific set of pedestrians. For instance, walking directions are still helpful even when the rider is part of a cluster of people moving in the same direction. Also, the vehicle may perform a modified pullover behavior, or even proximity unlock, when it knows where the rider is regardless of identifying exactly which person in the cluster is the rider.

One aspect of the technology may use Bluetooth signals for wayfinding. For instance, given a determined location of the vehicle and beacon signals emitted from the vehicle that are detected by the rider's device (including RSSI information), trilateration may be employed to calculate the current position of the client device. This can provide an estimate of the rider's position on the order of 1-10 meters. Another aspect of the technology may use ultrawideband RF signals for location refinement. An ultrawideband approach does not rely on RSSI, which has a coarse understanding of location (on the order of a few meters or more). Instead, a system using ultrawideband signals computes distance using time-of-flight information. This approach can be accurate to roughly 50 cm when the rider is in the 1-50 meter range from the vehicle. While using an ultrawideband approach may use a relatively high amount of power, it could be used sparingly at specific times to get the higher accuracy location information. By way of example, the system could use a layered approach that employs GPS location from the rider's device for a general location estimate, and then employs ultrawideband and/or Bluetooth techniques once the rider is estimated to be within some threshold distance of the vehicle or the pickup location.

For example, another aspect of the technology to identifying the correct rider with a high degree of certainty (e.g., above 80-90% certainty) involves historical information and behavior prediction. As noted above, pedestrian object characteristics may be input into a behavior prediction module of the vehicle's behavior modeling system. The behavior modeling system uses various behavior models that are based on object type to output one or more predicted future behaviors for a detected object. With regard to pedestrians, object trajectories may be a list of positions and orientations or headings (e.g., poses) of people walking in the scene, as well as other predicted characteristics such as speed. According to one example, input could include pedestrian behavior in response to communications to their phone or other device. For example, if the vehicle sends audio or visual communications to the rider's phone and a pedestrian gestures or adjusts glance/gaze to their device, that could be one contributing input to determining whether they are the rider. Thus, in one aspect, the system may model head gaze behavior for pickup with behavior prediction of approach. For instance, pedestrians at corners who are turning their heads actively back and forth multiple times may be considered to be looking to cross or engage with traffic behavior. Here, knowing the pose of pedestrians, heading and "keypoints" that indicate posture and motion as well can be useful indicators. Modeling such "my ride is here" behavior may be indicators (combined with other signals) of the rider. In addition, if the rider is riding with family member that require gear, e.g., a child seat, booster seat, stroller, etc., then pedestrian with those objects may be likely candidates.

Historical Information and Behavior Prediction

The more robust the historical information for a given pedestrian object, the more likely it is that the behavior prediction for short-term actions (e.g., in the next 5-10 seconds) will be accurate. This can include evaluating all nearby detected pedestrian objects, as well as using contextual information about the rider. In one example, knowing where rider first hailed the trip could be used to determine whether someone is walking from that direction. For instance, this can include using a street address or geolocation coordinates to determine where the person would have walked out of a building. The vehicle may maintain historical information on a rolling (e.g., first-in, first-out) basis for 10 seconds, 30 seconds, 60 seconds or more. Alternatively, it may maintain historical information for objects within some threshold distance (e.g., 100-250 meters) of the vehicle. How long or how far the historical information is maintained could vary for different object types. Thus, because pedestrian objects tend to move slower than bicycle objects or vehicle objects, the system may maintain historical information for such slower moving objects longer during a pickup scenario.

In a situation where the trip was scheduled from a place nearby the pickup location, e.g., from a mall, office building or apartment building within 2-3 blocks or within 250 meters of the pickup location, the system could determine an expected walking path of the rider from the location where it was scheduled to the selected pickup location. This expected walking path could be derived based on roadgraph or other highly detailed map information that indicates where sidewalks, crosswalks, streetlights and street signs, static obstacles (e.g., mailboxes of covered bus waiting spots) are located. It could also be based on whether there are different access (e.g., egress) points for the building. Multiple paths could also be created depending on the number of likely routes that could be traversed (e.g., cutting across a grassy area instead of taking a longer route around a corner). Each expected walking path could be ranked from most to least likely. This ranking could be refined based on current scene conditions. For instance, a delivery truck may be parked in front of a crosswalk, so a different walking path that avoids the crosswalk may be ranked higher. Here, the vehicle's processing system could compare the expected walking path(s) against the historical information for the detected pedestrian objects.

When considering access points, the system may evaluate not just raw location information, but the most likely access point and what would the trajectory be from that access point. In addition or alternatively, the system could temporarily maintain historical GPS of other location information from the rider's client device, such as the last 30 seconds or 2 minutes' worth of location information. This location information may be limited to data to get a general approximation of the location (e.g., just the first standard deviation's worth of location data).

In one scenario, this information from the rider's device may only be requested when it is determined that the rider is within a certain range (e.g., either distance in meters or time in seconds or minutes) from the pickup location, or when the vehicle detects from its sensor data that there is a sufficient likelihood that the rider is in the area. In another scenario, the information may be requested from the rider's device within some timeframe prior to the planned pickup time, e.g., within 1-3 minutes of the pickup. Here, for a vehicle that has already arrived or is imminently arriving at the pickup location (e.g., in the next 30-60 seconds), receiving location-related information from the rider's device prior to the rider's arrival could be used to focus sensors of the vehicle's perception system on a particular area, so that the rider can be quickly identified once the arrive on the scene.

There is no need to receive "stale" information, such as location data from 10 minutes prior, as that would not be useful when predicting the rider's walking path or behavior. Thus, the vehicle may request the rider's device to only send location information or other relevant data from a specific timeframe (e.g., the last 20-30 seconds). The obtained information could be compared to the expected walking path(s) or at least a segment of the path(s), such as a 25-100 meter segment, as this could increase the confidence level of the person's actual path towards the pickup location.

Figure 6B:
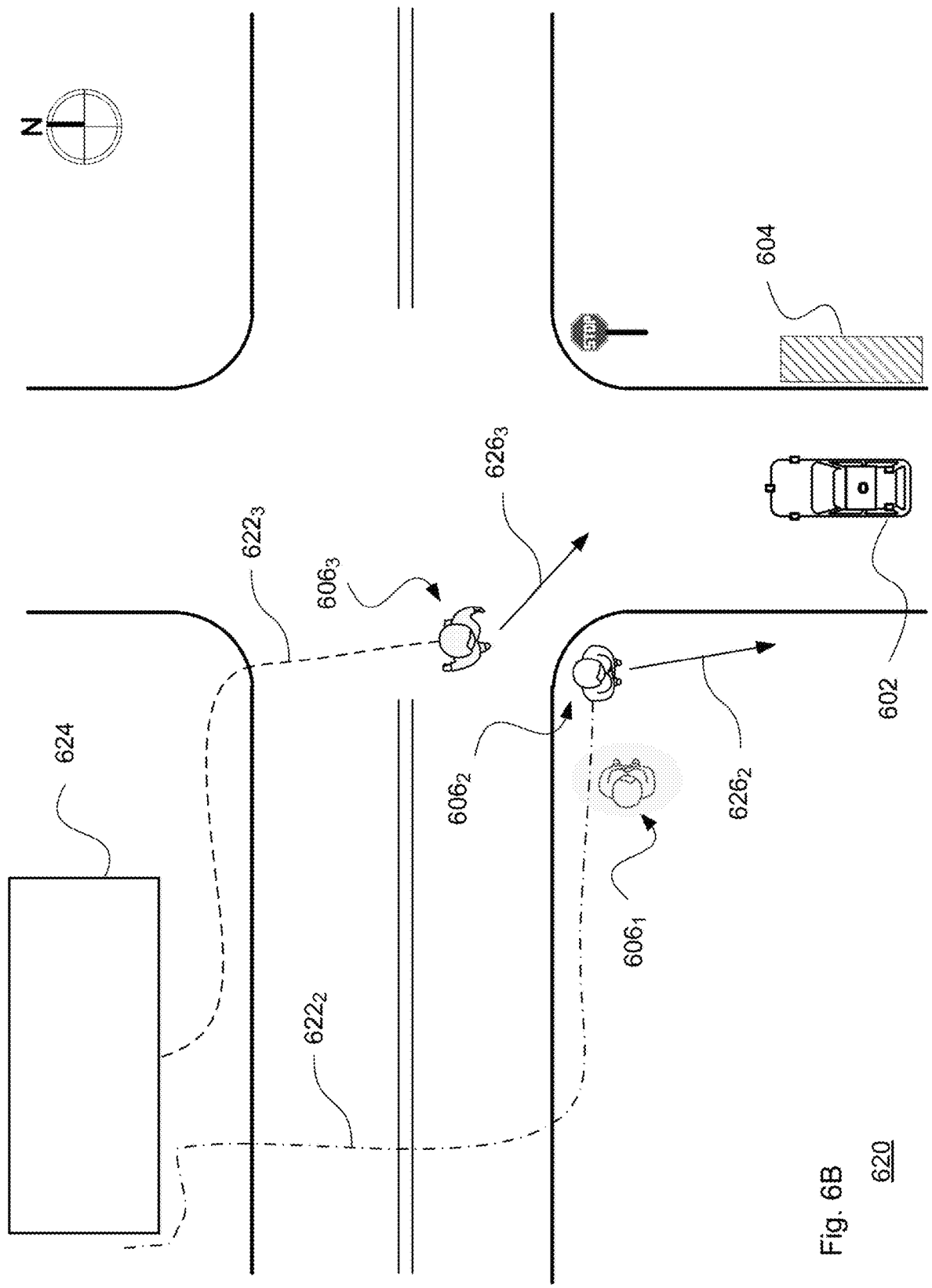

FIG. 6B illustrates a view 620 based on the scenario in FIG. 6A. Here, pedestrian object $606_1$ has been eliminated as a candidate to be the rider, and so is shown being greyed out to indicate the elimination. The remaining candidates are pedestrian objects $606_2$ and $606_3$. In this example, pedestrian object $606_2$ has a walking path $622_2$ and pedestrian object $606_3$ has a walking path $622_3$ (with the walking path of pedestrian object $606_1$ not being relevant any longer). These predicted walking paths may be based on the historical information and the likely access point from which each pedestrian object may have exited building 624.

As part of the behavior prediction, the vehicle's sensors may detect the current gaze direction of the likely pedestrian object candidates. This may not be possible if someone is wearing sunglasses or prescription glasses, which may affect the ability of the camera sensor(s) to identify the gaze direction. However, if the gaze direction is determined to be looking towards the vehicle or the pickup location when the person is within some threshold distance of the vehicle or the location (e.g., within 10-15 meters, or more or less), then the system may increase a confidence score that that pedestrian object is likely the rider.

Other information based on the scheduled ride may provide additional contextual cues as to which person could be the rider. For instance, when the ride was scheduled, the person may have indicated that they wanted a particular type of vehicle (e.g., a minivan), or that they needed access to the trunk or other storage compartment. Thus, if one pedestrian object in the list of candidates is detected to be pushing a stroller, walking with a service animal, or using a rollator, then the system may determine that that person is more likely to be the rider than other candidates in the list.

Based on the available historical information and real-time sensor information of the scene in the vehicle's environment, the system can predict how each pedestrian object of interest will move over the next few seconds (e.g., next 2-10 seconds). Thus, as shown in FIG. 6B, pedestrian object $606_2$ has a predicted path $626_2$ and pedestrian object $606_3$ has a predicted path $626_3$. As shown in this example, the predicted path $626_2$ of pedestrian object $606_3$ is moving toward the pickup location 604, while the predicted path $626_2$ of pedestrian object $606_2$ is moving down the sidewalk opposite to the pickup location 604. Furthermore, someone walking off the curb in the middle of the street, straight towards the vehicle and not near crosswalks would be a good example of a situation in which the behavior prediction might lead the person to the vehicle's door.

In addition to using information from the rider's client device(s) and the vehicle, information from other vehicles in the fleet and/or from other sources could be employed in the approaches described above. For instance, another fleet vehicle may have driven along the same segment of roadway very recently, such as in the last 10-30 seconds. Information from that vehicle's perception system could be used to enhance the information obtained by the vehicle assigned to pick up the rider. This can include identifying different pedestrian objects (objects in the environment determined by the system to have a high probability to be pedestrians) and determining if there are any pedestrian objects detected by the other vehicle which may be near or approaching the pickup location. This could be used to help in situations where the pickup vehicle is occluded from one or more pedestrian objects, for instance because a truck is parked on the side of the road, or there are other people standing in front of the rider at an intersection. Here, another fleet vehicle traveling in the same direction, the opposite direction, or passing through the same area (e.g., driving along a cross street at an intersection) may have an unoccluded view from its lidar sensors, cameras or other sensors. Sensor information from the other vehicle(s) could be used to supplement the data from the vehicle's own sensor system, for instance to effectively increase the vehicle sensors' field of view.

Figure 7:
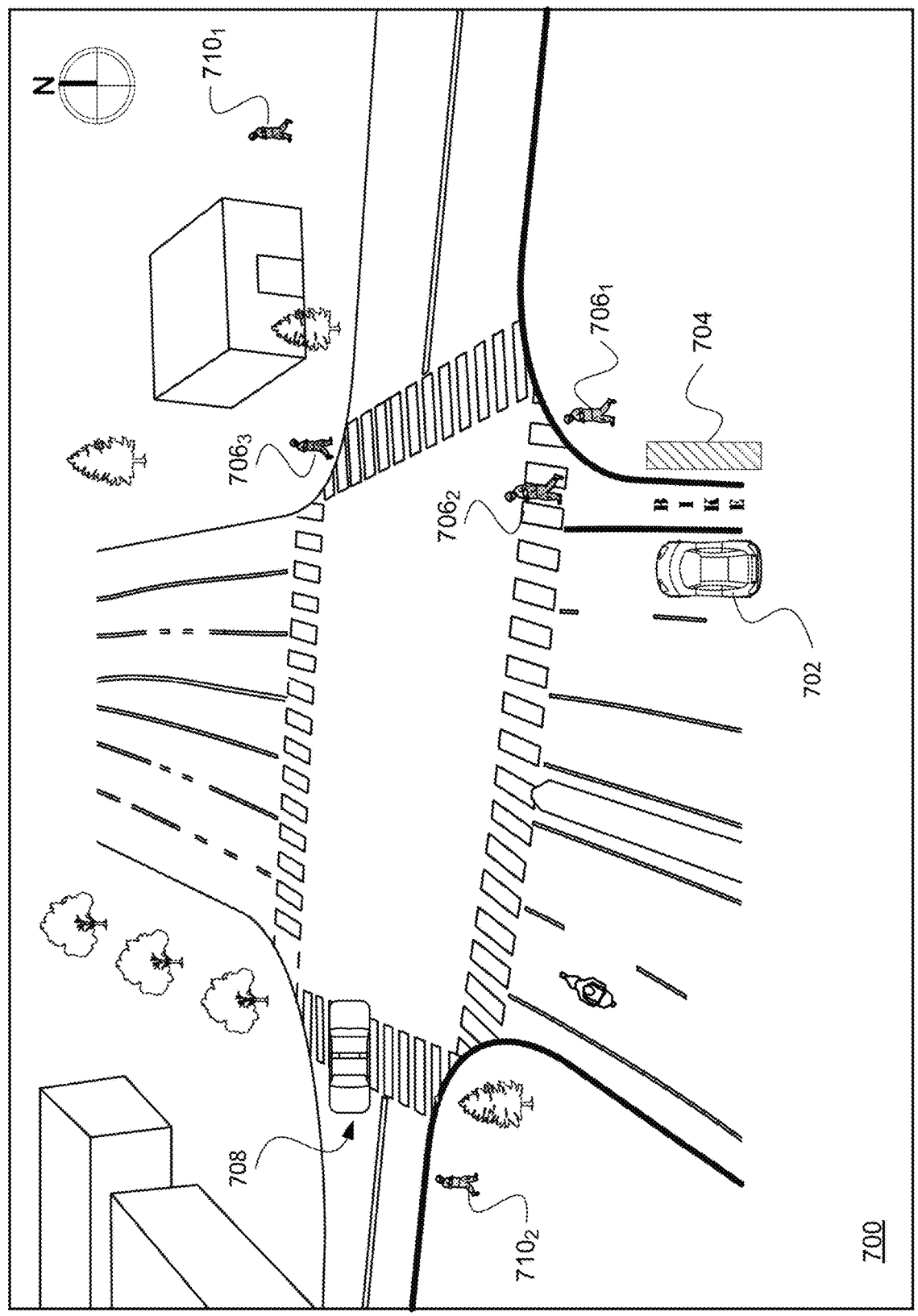
FIG. 7 illustrates another example for a rider pickup in accordance with aspects of the technology.

FIG. 7 illustrates an example 700 of this type of situation. As shown, vehicle 702 has arrived at pickup location 704 facing northbound on a first road segment. The perception system of vehicle 702 detects a number of pedestrian objects $706_1 \ldots 706_3$. In this example there are other people in the scene that were not identified as pedestrian objects, for instance because they have been occluded from the sensors of the vehicle 704. Here, another vehicle 708 of the fleet has just passed through the intersection traveling westbound. In this case, the other vehicle 708 detected pedestrian objects $710_1$ and $710_2$ as it drove by. Information about these pedestrian objects may be transmitted to the vehicle 702. This can include the last known location of those objects, historical information about their walking paths, any predicted paths generated by the vehicle 708, etc. The vehicle 702 could then use this information to update its list of pedestrian objects as possible rides or otherwise make any necessary pickup-related adjustments.

Pickup Location Adjustment and Example Situations

In certain situations, the rider, the vehicle or the ride hailing service may adjust the pickup location prior to the rider entering the vehicle. For instance, this may be done because another vehicle is parked in or blocking the initially selected pickup location. Or it may be more convenient to pick up the rider on the other side of the street, around the corner, etc. in order to reduce the walking distance to the vehicle, avoid traffic congestion, etc. Upon adjustment of the pickup location, the system could update the expected walking path of the rider to the adjusted pickup location. Here, the timing of the adjustment could be compared against the behavior of any pedestrian object in the list of likely rider candidates to see if a particular pedestrian object is detected to change its walking direction or otherwise move towards the adjusted pickup location.

There may be particular situations in which it is particularly challenging to identify whether a particular pedestrian object detected by the vehicle's perception system is the rider. By way of example, a pullover scheduled for a location near a parking lot could involve detection of many different people walking towards the parking lot on their way to their own vehicles. Here, the vehicle or the ride hailing service may initiate an adjustment to the pickup location, such as when the vehicle detects that there are more than a certain amount of vehicles parked in the parking lot (e.g., more than 3-5 cars, or when it is estimated that the lot is more than 15-30% full).

In other situations, there may be multiple riders which may arrive at the pickup location together (e.g., a family with children or business colleagues heading to a client meeting) or separately (e.g., friends meeting up to head out to dinner, a concert or sporting event). In the former case, knowing how many riders are scheduled for a multi-passenger trip can be used by the vehicle, such as by identifying a group of pedestrian objects generally moving in the same direction at approximately the same pace. For example, if there is a four-person trip, should the vehicle's perception system identify a set of four pedestrian objects moving toward the pickup location, it could assign a very high likelihood to the group (e.g., 90-95% likelihood) that that group is the set of riders to be picked up. In such a situation, the likelihood may be rated as very high even without receiving any location-related information from the riders' client devices, fleet sources or other sources. In the latter case, the various pedestrian objects detected in the scene could be evaluated to see whether some of them are converging towards the pickup location, the vehicle's current location, or some other location. Here, for instance, the friends may meet up at some intermediate location, such as at the corner of an intersection, before heading to the pickup location or the vehicle's current location. Determining whether multiple pedestrian objects are converging can be used to adjust the likelihood that each of those objects is one of the riders to be picked up, and the vehicle's system may update its list of possible rider candidates accordingly.

Training a Pedestrian Object Model

Machine learning models for pedestrian objects, which may include neural networks, can be trained on "ground truth" data associated with a pickup location, geolocation data of a rider, perception information from a vehicle (or a fleet of vehicles) and/or the vehicle location itself. This may be done for different types of pickup scenarios, both with and without other nearby objects (e.g., cars or other vehicles on the roadway, pedestrians or bicyclists on sidewalks, etc.). The training may be based on gathered real-world data (e.g., that is labeled according to road environment, intersection type, the presence of sidewalks, signage such as stop or yield signs, etc.). From this, one or more models may be developed and used in real-time by the self-driving vehicles, after the fact (e.g., post-processing) evaluation by a back-end system, or both. This can include a rider or customer localization model for detected pedestrian objects that is used to refine an estimated position of the rider in a particular geographic area. By way of example, the model structure may be a deep net, where the exact structure and parameters can be searched through automated machine learning, e.g., using a Neural Architecture Search (NAS) type model. Based on this, the onboard system (e.g., planner system, routing system and/or the behavior system of the vehicle's autonomous driving system) can utilize the model(s) to evaluate detected pedestrian objects and handle pickup (and drop-off) situations accordingly. This can include creating a likelihood across all detected or identified pedestrian objects that each such object is the rider to be picked up.

In one approach, the system can use historical location data for each pedestrian object (e.g., the last 20-30 seconds of GPS location coordinates) in a Bayesian calculation (e.g., maximum a posteriori or MAP), to create a likelihood across all pedestrian objects. As noted above, the location information from the rider's client device may not be exact, so the historical information (e.g., collected every 1-5 seconds) can be a sequence of noisy location datapoints. In order to train the pedestrian object (localization) model to achieve a high likelihood that a given pedestrian object is the rider to be picked up, the training inputs may include different sets of ground truth data in addition to the rider's geolocation information. These other sets can include the selected pickup location or any adjusted pickup location, the vehicle's location at one or more points in time prior to or at pickup, perception information about the region around the pickup location (e.g., from lidar, camera, radar, acoustical and/or other sensors of a vehicle's perception system), supplemental sensor-related information from fleet vehicles, other sensor or location information associated with the pickup location, etc. The training data may also include highly detailed map information such as roadgraph data, which may indicate other objects in the scene that could affect a pedestrian's movement (e.g., a mailbox in their way, or a stop light, walk light or Pedestrian Hybrid Beacon that may regulate when pedestrians can cross an intersection or crosswalk). The model can be trained with any combination of such information.

Once the model is trained, it can be used by the vehicle or the backend system in different ways. For example, the vehicle may use the model to predict how each pedestrian object of interest will move over the next few seconds (e.g., the next 2-10 seconds), such as by generating a set of one or more predicted paths for each pedestrian object of interest. Here, given the path observed by the perception system, the vehicle could determine what the trajectory would be for that pedestrian object. This can include generating a likelihood value or composite score that the person associated with that pedestrian object would walk to the car (e.g., a percentage value or a ranking on a scale such as 0-4). Objects with scores falling below a threshold could be discarded from the set of likely rider objects, Objects with scores exceeding the threshold could be focused on, such as by requesting additional information from the rider's device, to help further narrow the list possible rider objects.

The vehicle or the backend system may also use the model to perform a back evaluation, matching the geolocation information to a most likely path. Here, knowing where a given pedestrian object is at a specific location in time, the system may work backwards to determine where that object came from. If this process indicates that the object came from the place where the trip was requested, it is an indication that the given pedestrian object is the rider. The back evaluation approach can also be used to identify how accurate the geolocation information is which is received from the rider's device. Highly accurate information (e.g., within 1-2 meters or less) may provide a higher confidence in the location of the rider than less accurate information (e.g., on the order of 10-20 meters). Also, given a pedestrian object's past, how likely are they to get into the vehicle, conditioned on the GPs signals or not, depending on if that information is available. This can be useful when someone is standing near the curb in the middle of a street without a crosswalk, for instance.

User Experience

Based on the above approaches, the system may achieve a high confidence that a given person in the scene is the rider. By way of example, this confidence level could indicate that there is a probability exceeding 85%-90% that a particular person is the one to be picked up for a scheduled ride (or that a group of people are the ones to be picked up). Using this enhanced confidence, the vehicle or the back-end system of an autonomous vehicle ride hailing service may make changes to the pickup or provide useful information to the rider(s) or others nearby, which can improve the overall user experience.

Proximity Unlocking

Proximity unlocking is a feature that can be reassuring to the intended rider. Here, knowing which person is the rider, the vehicle may wait to unlock one or more doors until that person is within a threshold proximity of the vehicle. By way of example, depending on the vehicle type and the pickup location, the door(s) may be unlocked once the person is within 1-2 meters of the vehicle. Alternatively, the door(s) may be unlocked or a sliding door of a minivan opened when the vehicle detects that the person is reaching for a door handle or taking some other action to indicate that they are preparing to enter the vehicle (e.g., putting down a package or folding up a portable bike). Here, a close-in camera (or lidar, radar or acoustical) sensor of the perception system may be arranged to detect objects within 2-3 meters of the vehicle.

When the door(s) is unlocked or opened could be adjusted by the vehicle depending on how many other people are around the vehicle. For instance, the more crowded it is, the closer the person would have to be to unlock the door. There may be time of day considerations that allow the vehicle to vary when to open the door. A late night pickup may involve the doors opening when the person is reaching for the handle, whereas a morning pickup may involve opening the door a few seconds prior to the person getting to the vehicle. Knowing that the vehicle has been locked and inaccessible to others before the rider gets to it can give the rider a safe and secure feeling because they are not getting into a car that might have been unlocked for a while.

In one scenario, the system may communicate to the rider (e.g., via an app on the rider's mobile device) to press a button on the device before unlocking. In another scenario, the vehicle need not unlock all of the doors. Instead, knowing which person the rider is, and which side of the vehicle they are walking towards, allows the vehicle to select which side's door(s) to unlock/open. In yet another scenario, the vehicle may cause interior and/or exterior lighting to illuminate in conjunction with the door(s) unlocking. And in a further scenario, weather conditions may be a factor used by the vehicle to decide on when to open a door. For instance, instead of opening a sliding door 10 seconds before the person arrives, if the ambient temperature is below some threshold (e.g., below 50° F.), the door may remain closed until the person is 2 seconds away in order for the interior to remain warm (e.g., on the order of 70° F.). In contrast, if there is heavy rain, the door may open earlier, e.g., 4-6 seconds before the person arrives, so that they may enter the vehicle without getting too wet. Furthermore, knowing which side the rider is approaching from can be beneficial so that the vehicle communicates to them in a targeted way that the door they're about to open is unlocked or is being unlocked. Rider awareness of the unlocking timing and locked state is meaningful for communicating security in addition to ensuring security. In some scenarios it may not be suitable to broadcast the unlocked status widely, or it can be helpful to show on the side opposite the rider that the door is locked to deter non-riders.

Pickup Location Adjustment/Early Boarding

Knowing which pedestrian object is associated with the rider allows the vehicle to determine whether to adjust the selected pickup location. For instance, if the rider is determined to already be at the pickup location when the vehicle arrives on scene, no adjustment may be necessary assuming that there is space for the vehicle to pull over. However, when the person is not quite at the pickup location, the vehicle may determine that it would be better to perform an early boarding operation by pulling up 50 meters beyond the pickup location and sending the rider a notification of the adjusted pickup location. This would avoid the rider having to walk the extra 50 meters unnecessarily.

Another aspect of this approach could involve changing the amount of time that the vehicle will wait at a pickup location. Here, knowing that the rider is not close to the location (e.g., more than 400 meters from the pickup spot), the vehicle may change from a default wait time (e.g., 2 minutes or more or less) to a longer wait time (e.g., 5 minutes or more). Alternatively, the vehicle may move to a different spot so that it can wait longer, for instance when the initial pickup spot is in an area with limits on idling.

In another scenario, if there is a pedestrian nearby and the vehicle determines that they are not the rider and just crossing the street, the planner could cause the vehicle to not proceed while it waits for the pedestrian to continue walking. However, using the above techniques, the vehicle may determine that the pedestrian is actually the rider and that they are just walking to the other side of the vehicle to enter it. Here, the vehicle would be able to use this information to switch to the proper boarding state, such as performing a proximity unlocking operation.

Gesturing

There may be crowded situations, such as at rush hour, when a concert or sporting event lets out, etc., where there are a number of other people very close to the rider. In this type of situation, just understanding if the rider is part of a cluster of people is useful to gauge how close they are to the pickup spot or to the vehicle. Here, if the vehicle detects a group of pedestrian objects all within a few meters of one another, the vehicle could request a gesture by the rider to signal to the vehicle, which would allow the vehicle to confirm that they are part of the group. This request could be done via an app on the client device. Similarly, the vehicle could select different ways for the rider to signal their location, such as by having the client device play a melody or other sound, or turn its flashlight on and off.

Communicating to the Rider and Other People

Having a very high confidence in knowing which detected pedestrian object is the rider (or riders) enables the vehicle to provide enhanced information to the rider, which can speed up boarding, reduce frustration with waiting, or otherwise make the pickup more enjoyable. As noted above, if the rider is not quite at the pickup location, the vehicle may change the protocol of pickup, encouraging the rider to board faster by modifying the pickup location to a place closer to where they currently are. Or if the rider is not close, then the vehicle may circle the block if it would need to block traffic while waiting. Either way, the vehicle may send one or more notifications to the rider about the ride, such as an adjustment to the pickup location, where the vehicle currently is or plans to be, how best to enter the vehicle, etc.

The vehicle may customize user messaging based on whether the system determines that the rider is close or not close. By way of example, if the rider is far from the pickup location (e.g., more than 300 meters or more than 3 minutes away), the vehicle may send a message indicating when they expect the rider to arrive or how long the vehicle may be able to wait at the selected pickup location, or offer the option to reschedule where the vehicle can then determine to go ahead and circle (as opposed to unnecessarily waiting at the spot while blocking traffic). However, if the rider is close (e.g., within 25 meters), the message may indicate that the vehicle is very close and ready for them to board. One aspect of proximity-based messaging involves the use of different support tools at different times as the rider approaches the vehicle or the pickup location. This is discussed in more detail below.

In addition, the timing for when to send information to the rider may vary depending on the distance they are from the vehicle. Here, the closer the person gets, the more frequent the messages may become. Alternatively, the closer the person gets, the more specific the messages become. This can include providing more granular walking or turn-by-turn directions, identifying landmarks along the path or objects in the way (e.g., "turn left at the barbershop pole" or "watch out for the broken sidewalk in 20 feet"), details about the vehicle (e.g., "the blue minivan"), etc. For instance, when the rider is 100 meters away, the vehicle may communicate that they should be there in under 2 minutes after walking straight another 2 blocks. And when the rider is within 20 meters or on the same block as the vehicle, the vehicle may select a message that indicates exactly where it can be found (e.g., "Waiting behind the red SUV about 10 meters from you to the left"). Or the vehicle may send audio, imagery or a short video showing the vehicle or where it is relative to the rider, or otherwise indicating to the rider how to get to the vehicle (which could involve haptic feedback on the rider's device to indicate a direction to walk along. Thus, while the vehicle may have a default set of messages and/or default timing for when to send those messages to the rider, the vehicle is able to modify the messaging and/or timing based on real-time conditions at the pickup location. According to one aspect of the technology, tools presenting different types of messages, such as turn-by-turn directions, a compass-type directional user interface, and/or sounds as the rider approaches the vehicle, can be seamlessly transitioned either as a function of distance from the vehicle or at different points along the rider's journey to the vehicle or the pickup location.

The vehicle may communicate with the rider about modifying their walking path, such as to avoid an obstacle or a crowd of people. The app user interface on the rider's device may present information (e.g., images or a video) from the rider's perspective (what the person walking to the pickup location would see) or from the vehicle's perspective, with the latter case being helpful to give the rider a different viewpoint to aid in getting them to the vehicle. The user interface could include captioning, highlighting or audible information to explain what is being shown. In one example, instead of a pin on a map, there could be an audio description ("I'm parked near the large bush or double parked next to the tan sedan"). This could alternatively be done via chat as well, such as employing a chatbot with the rider that leverages data between the vehicle and client data to inform the rider of the location. In another example, the system could suggest a starting point for walking directions to the rider, or suggest one or more interim points for walking direction. These could include locations/waypoints for the person to pass through to more easily reach the pickup location. In yet another example, the system may present the user with a 3D representation from the perspective of the vehicle, to that the user may better able to identify where it is.

It is also possible for the vehicle to communicate with people other than the rider. Sometimes it may be helpful to others nearby to communicate with them. For instance, if someone who is determined not to be the rider approaches the vehicle, the vehicle may provide an audible and/or visual notification to them that the vehicle is waiting for someone else. Here, the vehicle may remain locked until the designated rider arrives. Communicating with non-riders could include presenting them with targeted messaging. At the same time, the vehicle may also provide information to the actual rider, such as boarding information displayed towards the rider but not towards other people around the vehicle.

As noted above, in some situations there may be multiple riders that will travel together but come separately. Here, the vehicle (or back-end ridesharing system) may provide individualized information to each rider. This can include separate walking or turn-by-turn directions. It can also include suggesting a location for some or all of the people in the party to meet up before arriving at the pickup location. For instance, the vehicle may suggest that each rider meet at a particular corner of an intersection so that they can all walk down the street together and enter on one side of the vehicle.

Rider Support

Sometimes there may be situations where more assistance is needed by the rider than can be provided by the vehicle. For instance, the ridesharing service can provide rider support via its back-end system. Here, human support personnel may be able to access imagery or a video feed from the vehicle to help locate the rider, or even access imagery taken by the rider's device. Here, the imagery from the client device may be used to help localize the rider, such as by comparing the obtained imagery against stored imagery of that particular area. This can be done by the back-end system with or without the rider support personnel. Further aspects regarding visual-based rider support are discussed below.

Rider support can involve the support member asking the rider to perform a gesture (e.g., "please raise your left hand") or move in a certain way ("please face left and look towards the blue minivan"). The person may request rider support via the app on their device. Or if the vehicle determines that the person is having difficulty finding the vehicle or the pickup location, it may send a rider support request to the back-end system.

Direct Communication

In another scenario, once the rider is close to the vehicle, the system may enable direct communication between the rider's client device and the vehicle's onboard communication system without routing information via a back-end ridesharing service, such as via an ad hoc communication link (e.g., Bluetooth), a WiFi link, or a cellular communication connection. This can reduce possible communication delays that may occur when routing via the back-end system. The direct communication could include telling the rider that their vehicle is pulling next to the red car in the parking lot, or request the client device to take some action (e.g., flash a light or make a sound) to allow the vehicle's sensors to identify where the person currently is with an extremely high degree of localization (e.g., to within 1-3 meters).

Example System Architecture

Figure 8A:
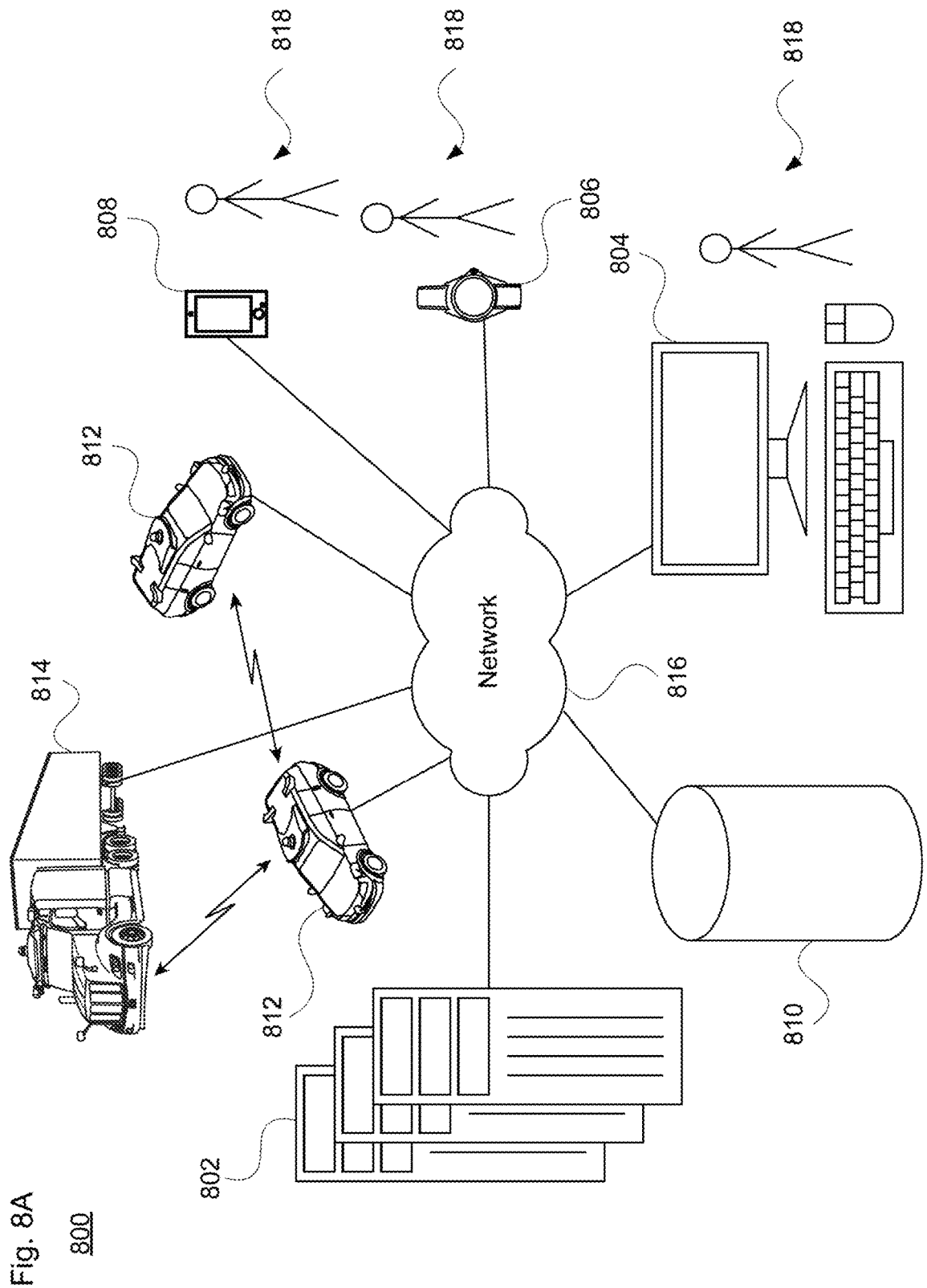
FIGS. 8A-B illustrate an example system in accordance with aspects of the technology.
Figure 8B:
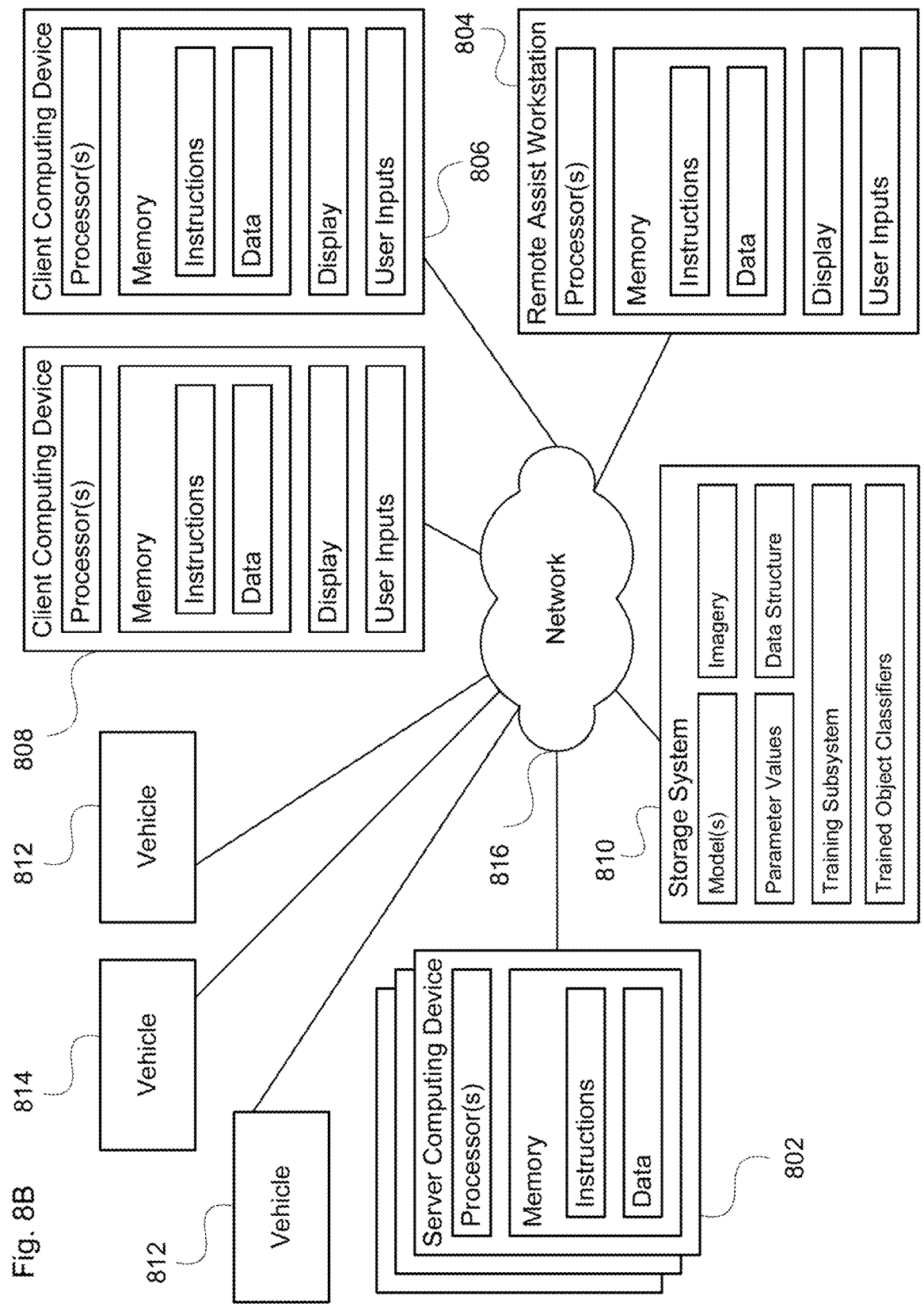

One example of a back-end system for fleet-type operation is shown in FIGS. 8A and 8B. In particular, FIGS. 8A and 8B are pictorial and functional diagrams, respectively, of an example system 800 that includes a plurality of computing devices 802, 804, 806, 808 and a storage system 810 connected via a network 816. System 800 also includes vehicles 812 and 814 configured to operate in an autonomous driving mode, which may be configured the same as or similarly to vehicles 100, 120, 140 and/or 160 of FIGS. 1A-E. Vehicles 812 and/or vehicles 814 may be parts of one or more fleets of vehicles that provide rides for passengers or deliver meals, groceries, cargo or other packages to customers. Although only a few vehicles and computing devices are depicted for simplicity, a typical system may include significantly more, such as tens or hundreds of vehicles.

As shown in FIG. 8B, each of computing devices 802, 804, 806 and 808 may include one or more processors, memory, data and instructions. Such processors, memories, data and instructions may be configured similarly to the ones described above with regard to FIG. 2 or 3A.

The various computing devices and vehicles may communicate directly or indirectly via one or more networks, such as network 816. The network 816 and any intervening nodes may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 802 may include one or more server computing devices having a plurality of computing devices, e.g., a load balanced server farm, that exchange information with different nodes of a network for the purpose of receiving, processing and transmitting the data to and from other computing devices. For instance; computing device 802 may include one or more server computing devices that are capable of communicating with the computing devices of vehicles 812 and/or 814, as well as computing devices 804, 806 and 808 via the network 816. For example, vehicles 812 and/or 814 may be a part of a fleet of autonomous vehicles that can be dispatched by a server computing device to various locations. In this regard, the computing device 802 may function as a dispatching server computing system which can be used to dispatch vehicles to different locations in order to pick up and drop off passengers or to pick up and deliver cargo or other items. In addition, server computing device 802 may use network 816 to transmit and present information to a user of one of the other computing devices or a rider in a vehicle. In this regard, computing devices 804, 806 and 808 may be considered client computing devices.

As shown in FIGS. 8A-B each client computing device 804, 806 and 808 may be a personal computing device intended for use by a respective user 818, and have all of the components normally used in connection with a personal computing device including a one or more processors (e.g., a central processing unit (CPU), graphics processing unit (GPU) and/or tensor processing unit (TPU), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 806 and 808 may be mobile phones or devices such as a wireless-enabled PDA, a tablet PC, a wearable computing device (e.g., a smartwatch), or a netbook that is capable of obtaining information via the Internet or other networks.

In some examples, client computing device 804 may be a remote assistance workstation used by an administrator or operator to communicate with riders of dispatched vehicles. Although only a single remote assistance workstation 804 is shown in FIGS. 8A-B, any number of such workstations may be included in a given system. Moreover, although operations workstation is depicted as a desktop-type computer, operations workstations may include various types of personal computing devices such as laptops, netbooks, tablet computers, etc. By way of example, the remote assistance workstation may be used by a technician or other user to help process sign-related, including labeling of different types of signs.

Storage system 810 can be of any type of computerized storage capable of storing information accessible by the server computing devices 802, such as a hard-drive, memory card, ROM, RAM, DVD, CD-ROM, flash drive and/or tape drive. In addition, storage system 810 may include a distributed storage system where data is stored on a plurality of different storage devices which may be physically located at the same or different geographic locations. Storage system 810 may be connected to the computing devices via the network 816 as shown in FIGS. 8A-B, and/or may be directly connected to or incorporated into any of the computing devices.

Storage system 810 may store various types of information. For instance, the storage system 810 may store autonomous vehicle control software which is to be used by vehicles, such as vehicles 812 or 814, to operate such vehicles in an autonomous driving mode. Storage system 810 may also store one or more models and data for training the models such as imagery, parameter values for the model, a data structure of different training information such as geolocation data, etc. The storage system 810 may also store a training subsystem to train the model(s), as well as resultant information such as trained classifiers. The trained object classifiers may be shared with specific vehicles or across the fleet as needed. They may be updated in real time, periodically, or off-line as additional training input data is obtained. The storage system 810 can also include route information, weather information, etc. This information may be shared with the vehicles 812 and 814, for instance to help with operating the vehicles in an autonomous driving mode.

FIG. 9 illustrates a flow diagram 900 according to one aspect of the technology, which provides a method for identifying a customer of a vehicle that is configured to operate in an autonomous driving mode. The customer may be a rider, person receiving a package, food order or groceries, a store employee loading the vehicle, etc. At block 902, the method includes receiving, by one or more processors of a computing system of the vehicle, perception information regarding a set of objects in an external environment of the vehicle. At block 904 the method includes determining, by the one or more processors, that the set of objects in the external environment includes a plurality of pedestrian objects, each pedestrian object corresponding to a person. At block 906, information is applied from at least two different sensor source types to a localization model to obtain a likelihood that each pedestrian object is the customer. At block 908 the method includes evaluating, by the one or more processors, the likelihood that each pedestrian object is the customer. And at block 910, upon determining that the likelihood for a given one of the pedestrian objects indicates that the given pedestrian object is likely the customer, the method includes performing at least one of: (i) sending a notification to a client device of the customer regarding a pickup location to meet the vehicle, (ii) adjusting the pickup location, (iii) causing modification to a driving operation of the vehicle in the autonomous driving mode, or (iv) transmitting information about the given pedestrian object to a remote management system.

Assistance Using Client Device Information

As noted above, various types of information may be shared from the rider's client device to aid in wayfinding and localization. This can include position data based on GPS coordinates obtained by the client device, or WiFi- or Bluetooth-derived RSSI information detected from the client device. It can also include other types of sensor information, such as still or video imagery captured by one or more cameras of the client device.

According to one aspect, a back-end rider support system can receive the imagery and use this to help guide the rider to the vehicle or the planned pickup location. There may be different conditions for which sharing the imagery with rider support may be beneficial.

For instance, when the quality of the GPS location information (or WiFi or Bluetooth™ RSSI information) is poor, imagery from the client device can help to provide contextual information. By way of example, when the system (either the client device or the back-end system) generates turn-by-turn directions for presentation to the rider on the user interface (UI) of their client device, but there is a sense of losing GPS accuracy (e.g., the accuracy degrades below a threshold such as a 10-25% loss in accuracy, or the number of satellites detectable by the client device falls below a minimum number, such as 3 or 4 satellites), then the client device UI may prompt the rider to chat with an agent, such as in response to a signal sent from the rider support system.

Another condition can occur when the rider prefers to obtain assistance from rider support. Here, the rider may use the UI on the client device to select a video chat or other assistance option, which invokes a chat with the agent according to a query transmitted from the client device to the rider support system.

In one scenario according to either type of condition, the rider is prompted for permission to share the imagery from their client device. This may be a separate request in addition to location sharing by the client device. By way of example, if the rider enables camera permission on their client device, a client device app (e.g., the app associated with scheduling or otherwise providing the ride with the autonomous vehicle) may transmit a set of imagery to a rider support server. Or the rider support server may send one or more requests to the client device requesting transmission of such imagery.

Figure 10A:
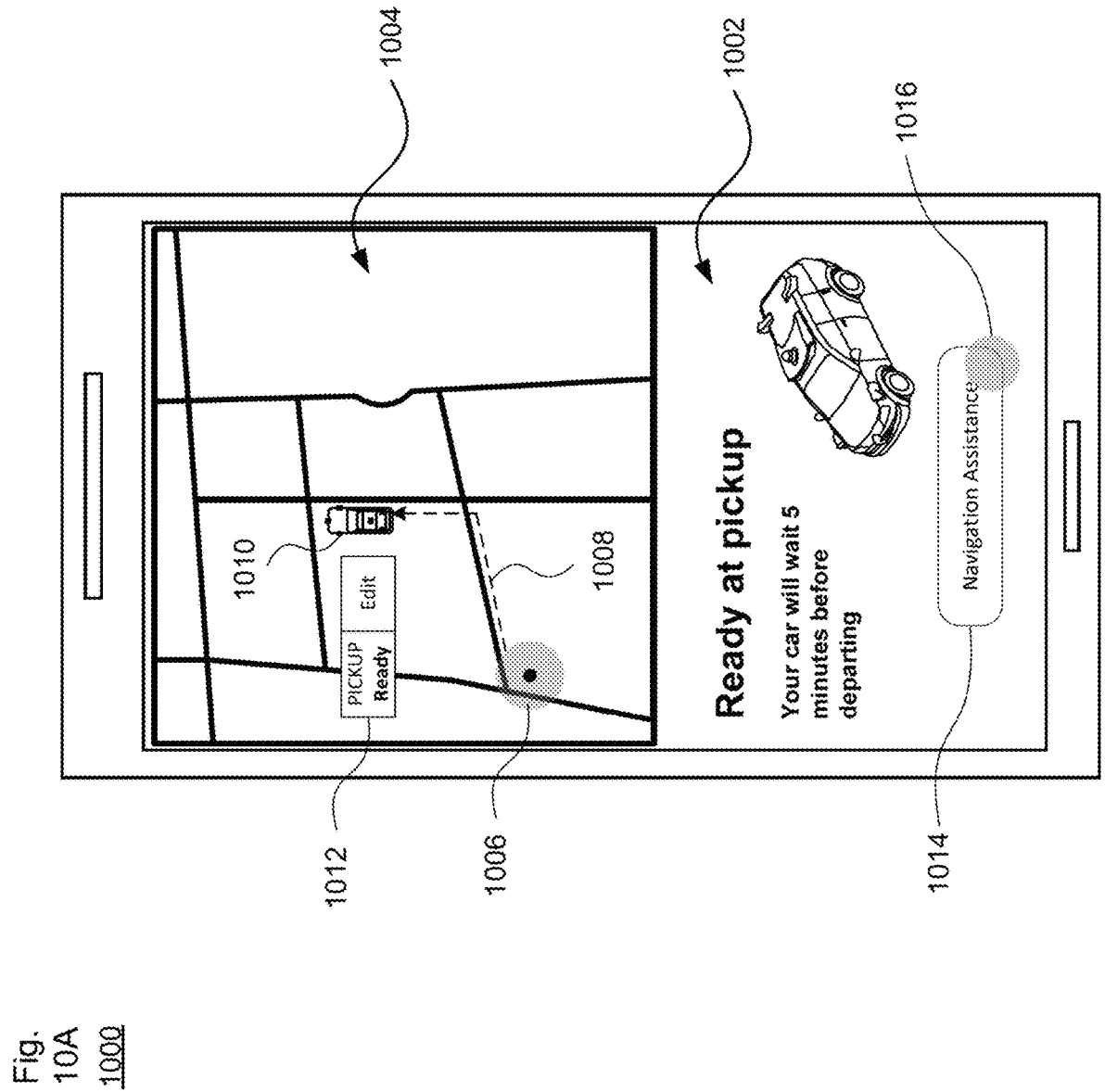

FIG. 10A illustrates a view 1000 of the client device UI, which indicates in a first (e.g., lower) section of the UI 1002 that the vehicle is "Ready at pickup". A second (e.g., upper) section of UI 1004 presents a map showing the approximate or estimated location 1006 of the rider, which may be based on GPS, Wifi, Bluetooth™ and/or other localization information. A walking path 1008 may be presented to guide the rider to the vehicle 1010. Also shown in the second section 1004 of the UI is a notification 1012 that indicates "PICKUP Ready" and gives the rider an option to edit details about the pickup, such as to change the location or time for the pickup.

As shown in the first section 1002, the UI includes an indicator 1014 for "Navigation Assistance". This indicator enables the rider to request a video chat with rider support. Should the rider select this, e.g., by pressing or otherwise selecting the indicator 1014 as shown by grey area 1016, and if the imagery permission is enabled, then a rider support agent would be able to see the rider's environment through the imagery obtained by the rider support system from the camera of the rider's client device. If the imagery permission is not already enabled, requesting navigation assistance by actuating indicator 1014 may generate a prompt to the rider to authorize image sharing with rider support. If the rider does not authorize the imagery permission, then in this situation no imagery would be shared from the client device.

FIG. 10B illustrates a view 1020 of a rider support agent's UI. As shown in this example, the agent's UI may include a number of sections, including a general trip information section 1022, a vehicle information section 1024, a state status section 1026, a fare section 1028 and a vehicle access section 1030. The general trip information section 1022 may include, e.g., a unique trip identifier ("Trip #"), the date/time the trip was created, a rider identifier that may be associated with a a user or billing account, a vehicle identifier for the vehicle assigned to the trip, and a fleet identifier if there are multiple fleets (e.g., a rideshare fleet, a local delivery fleet and a long-haul truck delivery fleet). The vehicle information section 1024 may include information such as vehicle ID and/or a license plate number, a "call state" (e.g., whether the vehicle is in service or out of service), a "rider state" (e.g., waiting to pick up the rider, en route with the rider, dropping off the rider, etc.), an autonomy level that indicates such as to indicate whether the vehicle is currently in a fully autonomous mode, a partially autonomous mode or a manual mode, and/or a last message field to indicate when the last message was either sent to or received from the vehicle. The state status section 1026 may include a set of the most recent state information for the vehicle, including whether it is on a trip ("Riding"), pulled over ("Pullover"), performing a drop-off ("Dropoff"), en route to pick up a rider or a package/cargo ("En route"), or waiting for a rider or a package/cargo ("Waiting"). Fare section 1028 can indicate the estimated or quoted fare for the current trip, which may update should additional stops be requested by the rider or based upon other factors such as traffic. The vehicle access section 1030, as shown, can present the status of each door, as well as the trunk or storage compartment access. In this example, the rider support agent may be able to remotely open either the left rear door or the right rear door, as shown by the shaded "OPEN" options. This may be done once the rider arrives at the vehicle.

View 1020 of the rider support agent's UI also shows a map section 1032 and an imagery section 1034. The map section 1032 may show the same map that the rider sees on their client device, or may show a different map. In the former case, the map may present the same walking (e.g., turn-by-turn) directions or other wayfinding information that is presented on the rider's client device UI (such as a compass or directional arrow). Here, as the directions in the client device UI change, an update signal (e.g., a data packet with updated information) may be sent to the rider support system to cause a corresponding change in the rider support agent's UI, In the latter case, the rider support UI map may present a larger area around the pickup location, rider and/or vehicle, may include different levels of detail such as real-time traffic information or other data provided by the vehicle or other vehicles in the fleet, etc.

The imagery section 1034 may present one or more still or video images received from the rider's client device. According to one scenario, the imagery is presented in real time and not maintained in long-term persistent storage by the rider support system. Once the real-time interactive support connection with the rider is established, the rider support agent can view both the map and the imagery, and may ask the rider to pan the camera(s) of the client device to get a better understanding of the rider's viewpoint. Here, the imagery may show street signs, store signs and/or other features of interest to help localize the user. In the scenario shown in view 1020, the rider support agent may be able to guide the rider to the vehicle by explaining that the vehicle is around the corner once the rider walks past the post office and the barber shoppe.

The rider support agent UI may provide one or more options for the support agent to annotate the UI of the rider's client device. As shown in FIG. 8B, a remote assistance workstation may include user inputs that can be used by the support agent. For instance, the rider support agent UI may enable the agent to add text or imagery to the map or other section of the client device UL. This could be an augmented reality (AR) insert, such as to indicate a direction to head along, to annotate the walking path that the rider should follow and/or to identify a landmark or the vehicle itself. The agent's UI may also be able to transmit an update the client device UI to generate haptic feedback to indicate a direction to head towards (or move away from) and/or to play audio (e.g., tones, tunes, melodies, etc.) to the rider as they approach the vehicle. Alternatively or additionally to the above, the agent may provide verbal instructions (e.g., "look for the mailbox and then walk another 20 meters").

The agent UI may also enable the agent to select how often to receive imagery from the client device, or to request that the client device to adjust one or more aspects of the imagery. This can include switching from a panoramic mode to a portrait mode (or otherwise change the aspect ratio), change from color to black and white imagery (or vice versa), change to slow motion, change the lighting, change the image resolution, etc. Alternatively or additionally, the agent UI may enable the agent to make modifications to temporarily buffered imagery locally (e.g., buffered only for the duration of the trip or only for the next 10-30 seconds, etc.) without requesting any changes from the client device and without saving the buffered imagery in persistent storage. This can include taking one or more snapshots from a video feed, crop, pan or zoom the imagery, etc.

Figure 10C:
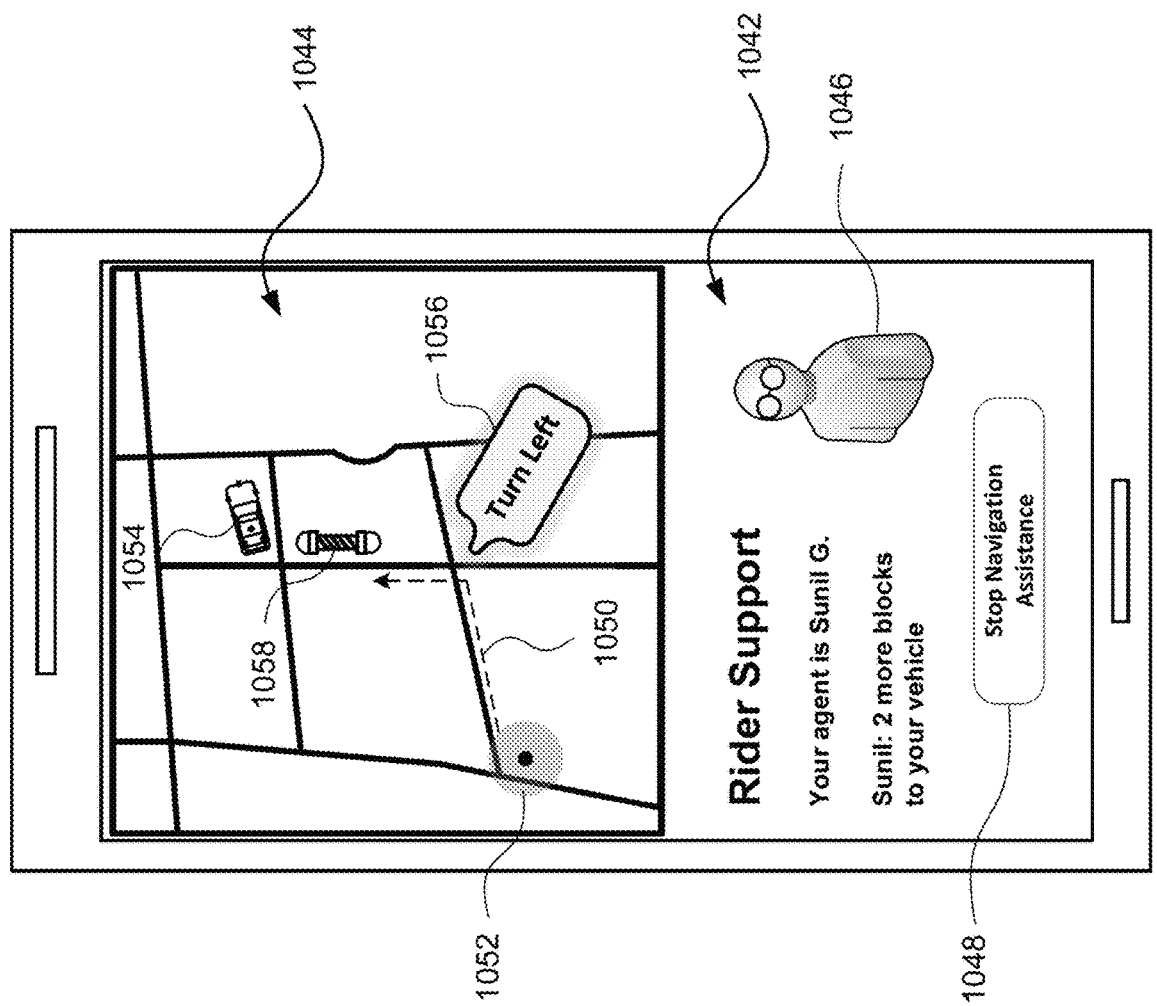

By way of example, FIG. 10C illustrates a view 1040 of the client device UI once rider support has been initiated. Here, the UI includes a first section 1042 and a second section 1044. The first section 1042 provides certain details about the rider support to the rider, such as the agent's name or ID #, a text box with textual information from the agent (e.g., "Sunil: 2 more blocks to your vehicle"). This section may also include an indicia 1046 of the agent, which may be a real time image or a photo of the agent, the agent's avatar, etc. In addition, a button or other actuator 1048 can be used by the rider to stop navigation assistance from rider support (or to simply stop sharing imagery). As shown, the second section 1042 may include a map with turn-by-turn or other directions 1050, an icon for the user's current (estimated) location 1052, and an icon 1054 showing the vehicle's location. In addition, should the agent generate objects or graphics on the rider support UI, those will be displayed on the client device UI. By way of example, an AR object 1056 with a "Turn Left" flag may be placed adjacent to an intersection, while a graphical object 1058 such as a barbershop symbol may be positioned where the barbershop on the street is located. Here, once the barbershop symbol is displayed, the agent can instruct (e.g., via audio and/or text) to turn right at the barbershop to see the vehicle around the corner.

Using this type of dual-UI interaction, the agent may guide the rider to the vehicle and identify a specific door to use when embarking. Here, once the rider arrives at the pickup location or is within some distance of the vehicle (e.g., within 5-20 meters, or more or less), the client device UI may illustrate a representation of the vehicle, for instance highlighting the door to use as shown by shaded door 1062. While not shown, the user may have an option in the client device UI to unlock that door (or another door or the trunk) themselves. Alternatively or additionally, the UI may present button or other actuator 1064 that authorizes rider support to remotely unlock the door. In this case, such authorization may enable the rider support agent themself to unlock the door, or the rider support server may automatically unlock the door once it is determined that the rider is within a certain proximity of the vehicle as noted above. By asking the rider to affirmatively grant permission to remote assistance, the rider can feel reassured that the door is only opened when needed by rider support. Alternatively or additionally, the client device UI may also provide an authorization option for rider support to remotely honk the horn, flash the lights or otherwise communicate to the rider prior to them entering the vehicle.

Acoustical Information and Personalization

As part of wayfinding to help the rider to arrive at the vehicle or a designated location, acoustical information can be played to the rider via their client device. This can be done through the client device's speaker(s) or through earbuds or headphones coupled to the client device. This can include selecting or curating various tones or melodies (e.g., euphonious sounds) that may be designed explicitly for wayfinding. This sound information may be stored in memory at the client device or streamed to the client device from a remove device such as the rider support system.

Sound selection or curation may be done according to a rider's personal preference(s), which may be maintained in a ride app at the client device or stored as part of the rider's account at a back-end server. Another type of personalization can include modification to a given tone, melody or other acoustical signal. Here, according to one aspect, the rider may be presented with one or more tools in the ride app UI, such as a slider to adjust the pitch (e.g., a more percussive melody or higher-pitched tonal elements) or to emphasize different tones (e.g., mid tones versus high tones).

According to another aspect, the system itself, e.g., either the ride app of the client device or the rider support server may automatically modify the acoustical information. For instance, the system may select one or more synthesized (e.g., MIDI) tones rather than natural tones because the synthesized tones may carry more easily in an environment with unwanted ambient noise. Thus, in one example a beep such as for an alarm clock might be selected rather than one or more chords of guitar strumming. Pitches with higher timbre may be chosen because they may be more identifiable than pitches with lower timbre. The modification by the system can also include changing the length of the provided sound(s) as the rider gets closer to the vehicle or the pickup location. This may be done in conjunction with altering the pitch or the tune.

Alternatively or additionally with any of the above, the system may provide a preview of the acoustical sound(s) that will be generated as the rider gets closer to the vehicle or the pickup location (e.g., within 10-100 meters). The preview may be generated as the rider begins to head towards the desired location, once the rider is within some threshold distance (or time) of that location, or once the rider reaches a particular landmark or other point of interest. The preview provides an auditory cue, which can make it easier for the rider to recognize the selected acoustical information at the appropriate time. In one example, the auditory cue may be reinforced to the rider one or more times.

In a further aspect, the acoustical information may be modified based on the ambient noise in the surrounding environment of either the rider or the vehicle. By was of example, as noted above the acoustical subsystem of the vehicle can provide directional information for sounds detected in the vicinity of the vehicle. This can include general ambient noise from other vehicles, construction equipment, etc. If the rider's device plays a tone or a short melody, the vehicle's acoustical subsystem may detect which direction (bearing) it came from relative to the position and orientation (pose) of the vehicle along a roadway. Or if the rider speaks to remote assistance personnel and the rider is close enough to the vehicle, the vehicle's acoustical system may be able to identify that and provide a visual or acoustical alert to the rider.

Ambient noise information obtained by this subsystem or via a microphone or other transducer of the client device can be used to identify "noisy" frequencies (e.g., 50 Hz to 200

Hz or 2200 Hz to 2500 Hz). It can also be used to identify specific types of noises (e.g., sirens from emergency vehicles, honking horns, construction equipment, etc.), such as by using a machine learning sound model or a set of heuristics and evaluating the ambient noise with the model or the heuristics to identify a type of object that generated the noise. Based on this identification, the vehicle, backend system or the rider's client device may select a tone, melody or other audio identifier to be played that avoids such noisy frequencies (or harmonies thereof), or that would otherwise be readily perceivable by the rider notwithstanding such noise. Thus, one or more synthesized tones can be selected that are in a different frequency band and are readily distinguishable from a siren sound.

By giving the rider advanced notice of which sounds to listen for, modifying such sounds as the rider approaches the vehicle, and/or otherwise accounting for ambient noise in the immediate surrounding environment, the system can help the rider perceive the desired sounds in order to help guide the rider to the location of interest (e.g., where the vehicle is parked or the pickup location).

Seamless Wayfinding Tools

According to further aspects of the technology, a set of wayfinding tools may be selected for presentation to the rider at different times, such as depending on how far or close the rider is to the pickup location or to the vehicle itself. This can include gracefully transitioning between different tools, which can enhance the tools' usefulness and elevate the rider's experience for the trip. This approach can include evaluating the proximity state of the rider relative to the vehicle or the pickup location. For instance, one proximity state could be that the rider is two or more blocks away (e.g., 2-5 blocks away, or at least 150 meters from the location of interest). Another proximity state could be that the rider is closer than two block away (e.g., 1 block away or within 15-50 meters from the location of interest). And yet another proximity state could bet that the rider is nearby the location, such as within 5-15 meters or closer.

Figure 11A:
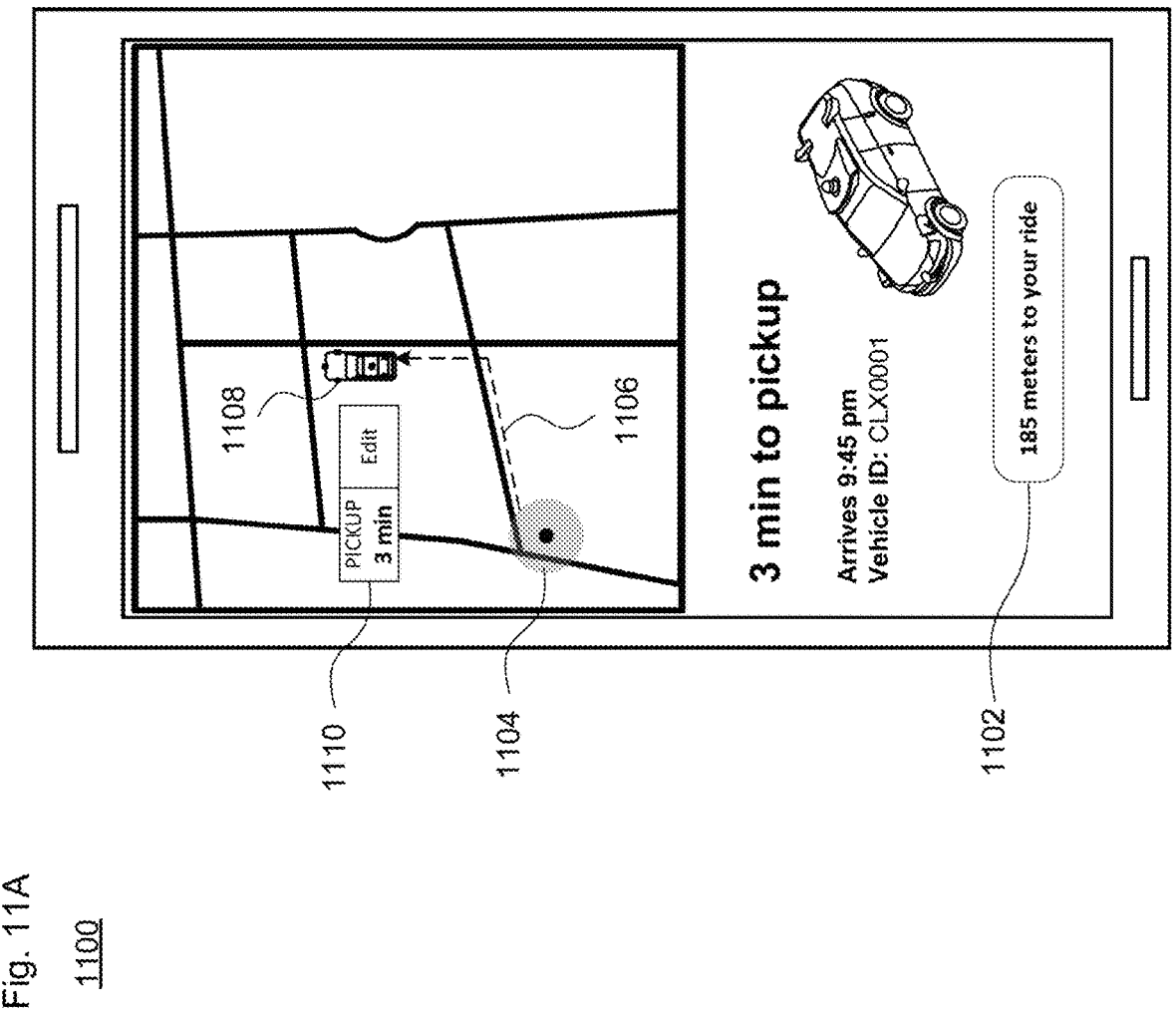
Figure 11D:
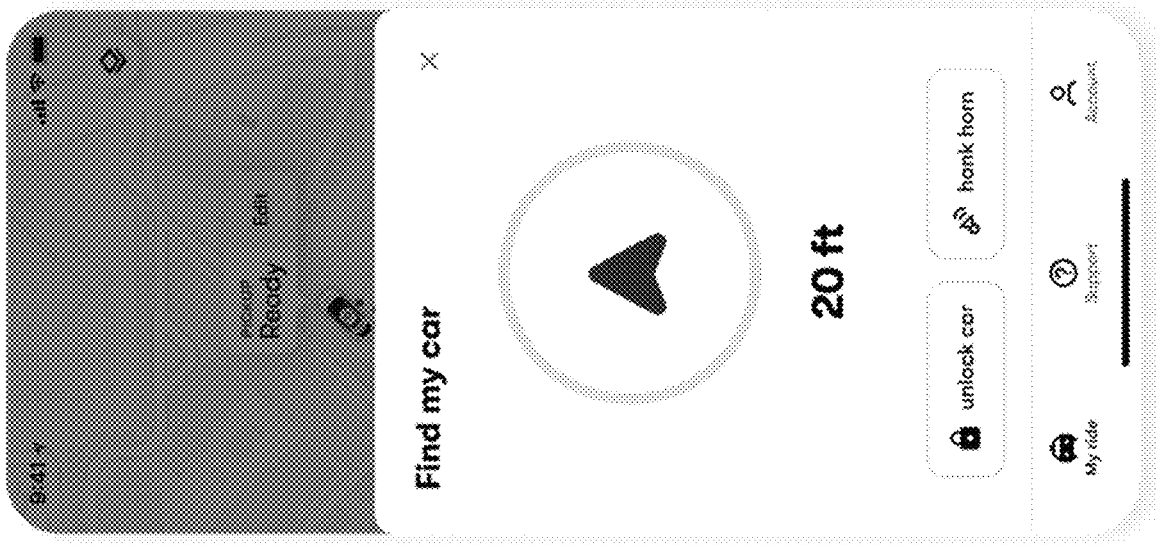
Figure 11C:
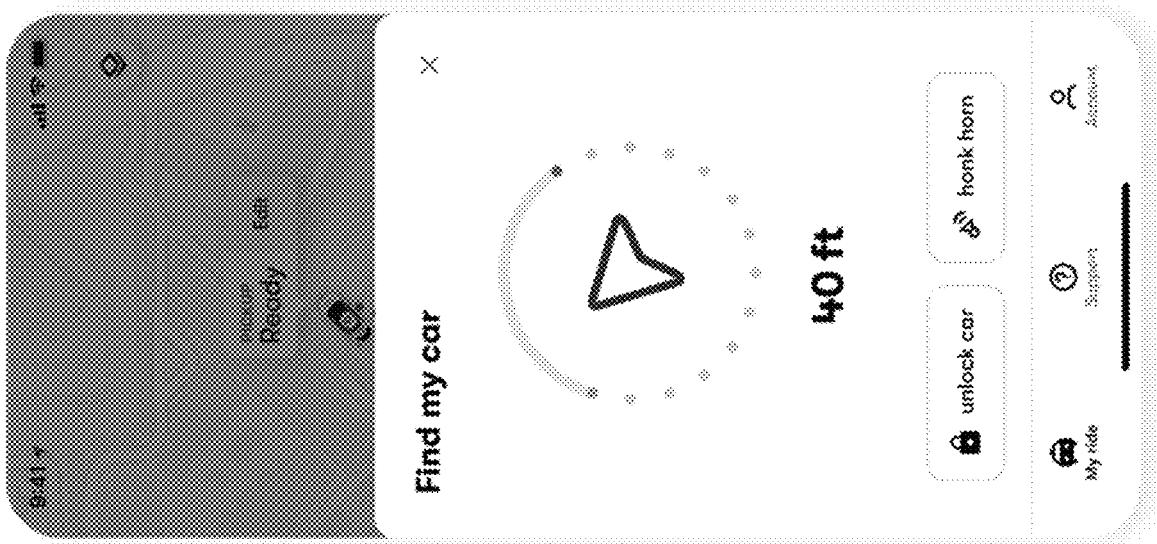

Each tool may be associated with one of the proximity states. For instance, turn-by-turn or other walking directions may be provided in the rider's client device UI in the proximity state where then rider is at least 2 blocks (or more than 150 meters) away. An example of such directions is shown in view 1100 of FIG. 11A. Similar to view 1000 of FIG. 10A, view 1100 indicates in a first (e.g., lower) section of the UI that indicates trip information such as "3 min to pickup" and "Arrives 9:45 pm", along with a vehicle identifier. This section may also include a text area 1102 that indicates the estimated distance to the location (e.g., "185 meters to your ride"). A second (e.g., upper) section of the UI presents a map showing the approximate or estimated location 1104 of the rider, which may be based on GPS, WiFi, Bluetooth™ and/or other localization information. Walking path 1106 (e.g., turn-by-turn visual directions) may be presented to guide the rider to the vehicle 1108. Also shown in the second section of the UI is a notification 1110 that indicates "PICKUP 3 min" and gives the rider an option to edit details about the pickup, such as to change the location or time for the pickup In the intermediate proximity state, such as within about a block but not within 10-20 meters of the vehicle, a compass-type wayfinding tool can be presented on the client device UI, replacing the turn-by-turn walking directions. An example of this is shown in view 1120 of FIG. 11B. Here, a first (e.g., lower) section 1122 of the UI includes a directional element 1124. The directional element may be a compass or other arrow as shown, or other visual indicator. Haptic and/or acoustical feedback to the rider may complement the visual directional element 1124. By way of example, haptics can be used to give the person a general sense of directionality. For instance, constant feedback could be provided when facing the right direction (toward the vehicle), increasing haptic intensity when moving toward the vehicle to indirectly indicate distance, and/or a distinct haptic sensation when arriving in the "nearby" state. The first section may also include one or more actuators 1126, such as to honk the vehicle's horn and/or flash the vehicle's lights. Textual information 1128 can also be presented (e.g., "Head northwest 60 meters"). The second (e.g., upper) section 1130 may illustrate a relevant portion of the map to help guide the rider as they follow the directional information. In this intermediate proximity state, the displayed directional element 1124 may change as the rider gets closer to the vehicle or pickup location. An example of this is shown in FIGS. 11C and 11D. As illustrated in view 1140 of FIG. 11C, the direction element may have a first appearance, e.g., an outline of an arrow or other compass element with a partly solid circle with a dotted arcuate section. In contrast, as illustrated in view 1160 of FIG. 11D, the direction element now has a second appearance, such as the arrow or other compass element being solid or filled in, and an unbroken circle around the compass element. Similarly, the text may change to indicate how close the rider is.

Figure 11E:
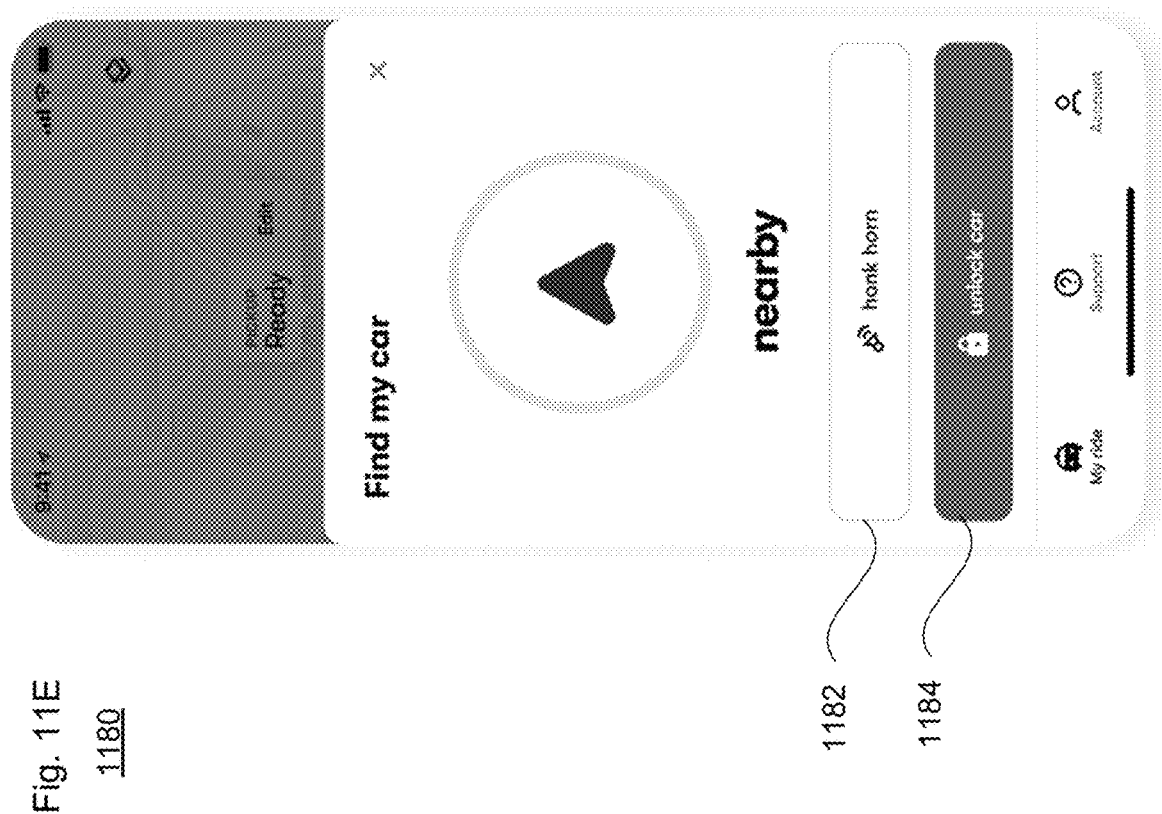

In the nearest proximity state, such as when the rider is within a few car-lengths of the vehicle or is standing across the street from the pickup location, the wayfinding tool may change again. An example of this is shown in view 1180 of FIG. 11E, in which the first section of the UI indicates that the vehicle is "nearby". In this proximity state, the UI presents a separate honk horn button 1182, which will afford the rider the ability to navigate those last few steps to board. An unlock car button 1184 is separate from the honk horn button 1182, and allows the rider to unlock one or more doors (or the trunk) of the vehicle. In one scenario, the door unlock and/or horn honk options may only be surfaced in the UI in the nearest proximity state.

One aspect of such proximity-based UI tools is providing a graceful handoff between the tools. By way of example, when the usefulness of one tool has been reached (e.g., turn-by-turn or walking directions would not be of any more help at a certain point, or the compass cannot give the rider any more useful information about their proximity to the vehicle), the UI seamlessly transitions to the next tool. The system (e.g., a wayfinding app on the rider's client device) may determine when the usefulness limit for a given tool has been reached in different ways. For instance, an absolute distance could be used as a cutoff. In this case, if the rider is closer than 150 meters from the location, automatically transition to the compass/directional UI tool. Or once the rider is estimated to be within 10 meters of the vehicle, automatically transition from the directional UI tool to the "nearby" UI tool. Alternatively, the system may evaluate how long a particular tool has been presented in the UI, and if the rider is no closer to the vehicle, change the tool. Thus, in this case, if the "nearby" UI tool has been presented to the rider for more than 30 seconds but the rider has not entered the vehicle, the system may automatically transition to the directional UI tool. This approach may elevate the experience for what is most helpful for the rider at that point in time. Also, the availability of various hardware devices (such as BLE or WiFi components or circuitry) or location accuracy might affect both which tools are selected to be presented to the user, and also a threshold at which the tools are shown based on distance (e.g., based on the location accuracy of the particular hardware devices).

Similar to this, the proximity-based UI tools could also be employed when the rider disembarks from the vehicle. Here, if the wayfinding app knows the rider's intended location (e.g., a convention center entrance 3 blocks from the dropoff location, the walking directions, directional UI and nearby UI tools could be generated on the client device to aid the rider as the head towards that destination.

Vehicle Controls

As noted in certain examples above, when using an autonomous vehicle ride hailing service, riders can have access to various actions and controls related to their trip or vehicle over the course of their journey. For example, when they are going to meet their vehicle, they may want to use navigation tools or controls to help them find their vehicle (e.g., controls that honk the horn or flash the lights). Once they are in their vehicle, the rider may want to adjust the car climate control(s) or play music (e.g., cast music from their client device to the vehicle's sound system.

For different riders with different needs, the relative importance of these controls can be different. For different environments or times of day, some controls may be more or less useful that in other environments or times of day. For example, riders who are low vision or blind might rely more on wayfinding tools than typically sighted users and these controls may need to be prioritized more highly for such riders. Or during the night or other low-light conditions (e.g., during a rainstorm or sandstorm), the control to flash the vehicles lights may be more relevant than during the day. The density of an urban environment or the accuracy of the current GPS signal may also affect the priority of actions.

To address the rider's need to access several controls in a variety of scenarios or conditions, and to reduce the number of action buttons on the map (which are not very accessible), aspects of the technology provide a flexible car control design system that allows several controls to be made available and to dynamically order the controls based on a variety of inputs including, but not limited to user needs/disabilities, environmental conditions, trip state, etc.

Figure 12A:
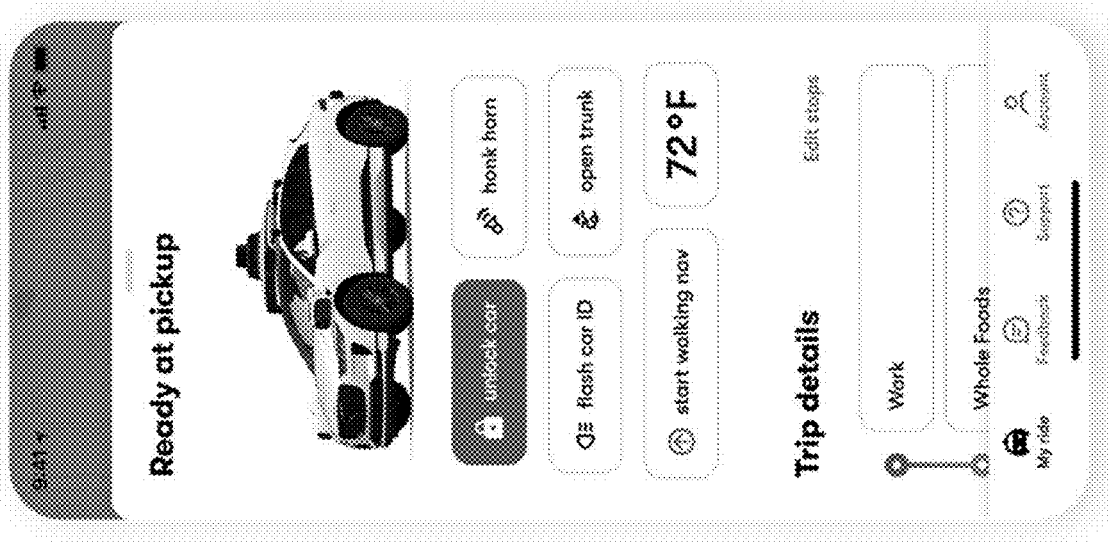
FIGS. 12A-B illustrate vehicle control features in accordance with aspects of the technology.
Figure 12B:
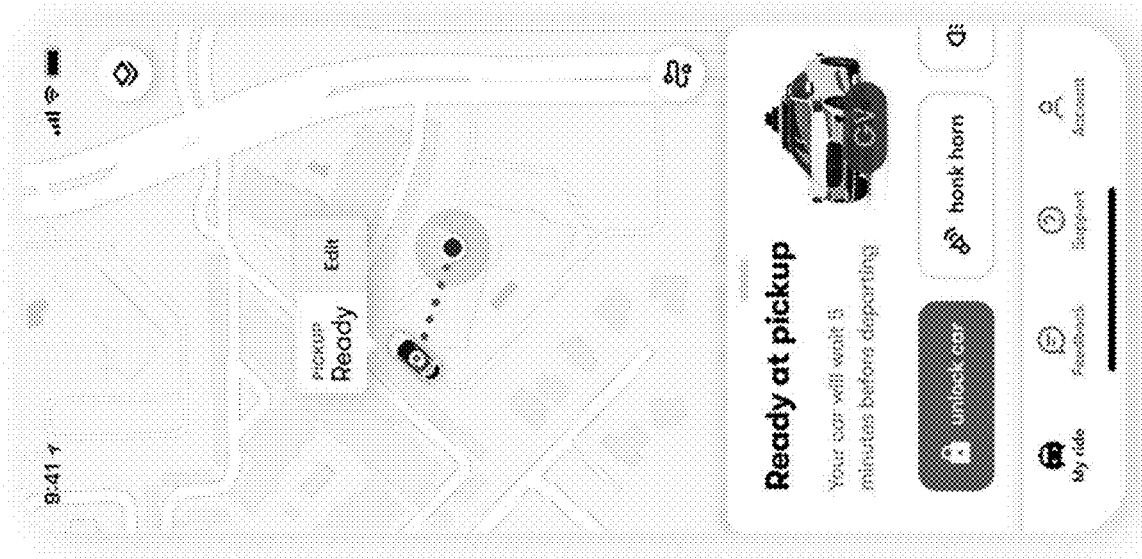

One scenario is shown in FIGS. 12A-B. Here, as presented in view 1200 of FIG. 12A, the client device UI may only show immediate actions within the controls "carousel" in collapsed state. Here, those immediate actions can include "unlock car" and "honk horn". These are controls to advance the trip (e.g., unlock car, start ride) or to wayfind to the car (e.g., start turn-by-turn directions or honk the vehicle's horn). This example leaves out vehicle preferences (e.g., display a vehicle identifier or interior vehicle HVAC control) from the collapsed state, but as shown in view 1220 of FIG. 12B, these options may be provided when the UI expands to view all in a grid in the expanded state.

One aspect of the vehicle controls UI is to cluster the controls together and to give riders direct access to the controls across trip states and in the moment when a given control becomes needed or useful. To keep the rider aware and focused, the UI may reduce the amount of information across the map, graphical information cards and other UI components, optimizing what is shown based on the trip state or task at hand. In addition, the UI may support a scalable design system where vehicle controls and a bottom sheet or other selected region of the UI can evolve to accommodate additional features and functionalities.

Figure 13:
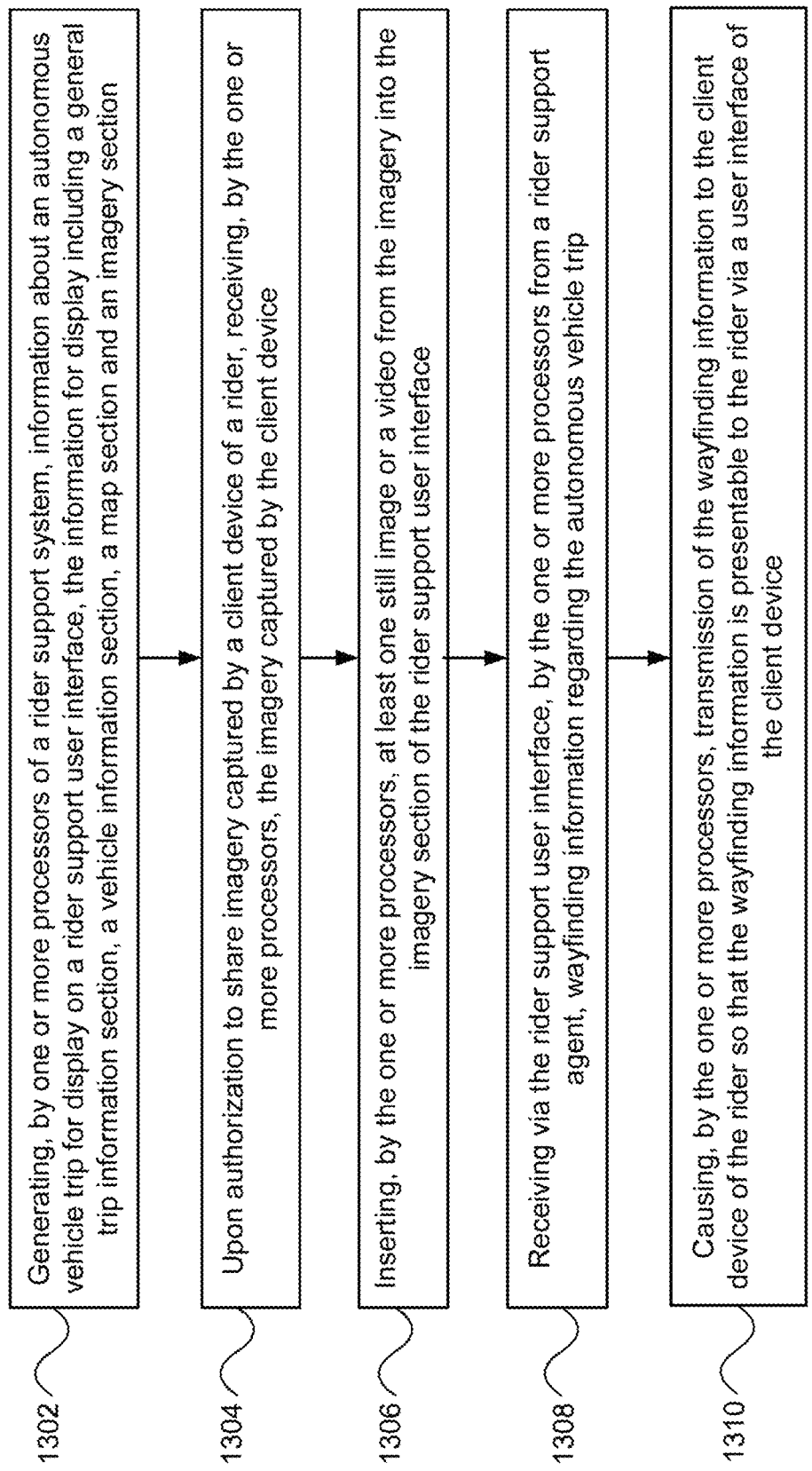

FIG. 13 illustrates an example method 1300 according to aspects of the technology. This includes, at block 1302, generating, by one or more processors of a rider support system, information about an autonomous vehicle trip for display on a rider support user interface. The information for display includes a general trip information section, a vehicle information section, a map section and an imagery section. At block 1304, upon authorization to share imagery captured by a client device of a rider, the method includes receiving, by the one or more processors, the imagery captured by the client device. At block 1306, the method includes inserting, by the one or more processors, at least one still image or a video from the imagery into the imagery section of the rider support user interface. At block 1308, the method includes receiving via the rider support user interface, by the one or more processors from a rider support agent, wayfinding information regarding the autonomous vehicle trip. And at block 1310, the method includes causing, by the one or more processors, transmission of the wayfinding information to the client device of the rider so that the wayfinding information is presentable to the rider via a user interface of the client device.

FIG. 14 illustrates another example method 1400 according to aspects of the technology. This includes, at block 1402, selecting one acoustical signal from a curated set of acoustical signals stored in memory, by one or more processors, upon initiation of a wayfinding action associated with a trip for a rider. At block 1404, the method includes causing, by the one or more processors, the selected acoustical signal to be played to the rider before the rider arrives at a vehicle that will perform the trip or at a pickup location. And at block 1406, the method includes modifying, by the one or more processors, presentation of the selected acoustical signal in response to either (i) a change in a distance from the rider to the vehicle or the pickup location, or (ii) ambient noise.

FIG. 15 illustrates another example method 1500 according to further aspects of the technology. Here, at block 1502, the method includes identifying, by one or more processors of a client device, a wayfinding status of a rider relative to either (i) a vehicle that is assigned to provide a trip to the rider, or (ii) a pickup location for the rider to meet the vehicle. Then, at block 1504, based on the identified wayfinding status, the method includes the one or more processors determining a proximity state of the rider to the vehicle or to the pickup location. At block 1506, the method includes selecting, by the one or more processors according to the determined proximity state, one proximity-based user interface tool from a set of proximity-based user interface tools, And at block 1508 the method includes causing, by the one or more processors, the selected proximity-based user interface tool to be presented in a user interface of a wayfinding application running on the client device.

While certain use cases described above focus on rider pickup situations in the ride hailing context, the technology may be used in many other situations. This can include delivery situations, where the person going to the vehicle may be a restaurant or store employee loading the vehicle with a meal, groceries, prescription or other package. Or the person may be the customer who is retrieving the package from the vehicle. Here, proximity unlocking may be particularly helpful with the door or trunk being opened when the person is very close to the vehicle. Similarly, in a trucking scenario, the person or people heading to the vehicle could be warehouse workers that will load or unload the truck with cargo, or that need to transfer cargo to or from the truck (e.g., a mail delivery truck).

And alternative to ridesharing, the technology may be used in a personal car ownership situation. For instance, the autonomous vehicle may have dropped off its owner at a particular location (their office, gym, grocery store, etc.) and then parked at an available spot. Here, the system could identify when their owner is walking toward the vehicle and signal to them, open the door, etc., as described above. Also, different protocols could apply in the case of ownership, with adjustments being made for proximity unlocking or early boarding in accordance with the owner's preferences.

Finally, the technology provides enhanced flexibility to preposition one or more vehicles of a fleet. This may be done to reduce how long it takes each vehicle to arrive at the selected destination for each respective pickup. In addition, the fleet management system may instruct certain vehicles to position themselves at particular locations to improve sensor coverage across a group of vehicles. This could be particularly beneficial when multiple people are leaving one place after an event (e.g., a movie or sporting event lets out) and different people may be using different vehicles for the ride home.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method, comprising:
   generating, by one or more processors of a rider support system, information about an autonomous vehicle trip for display on a rider support user interface, the information for display including a general trip information section, a vehicle information section, a map section and an imagery section;
   upon authorization to share imagery captured by a client device of a rider, receiving, by the one or more processors, the imagery captured by the client device;
   inserting, by the one or more processors, at least one still image or a video from the imagery into the imagery section of the rider support user interface;
   receiving via the rider support user interface, by the one or more processors from a rider support agent, wayfinding information regarding the autonomous vehicle trip; and
   causing, by the one or more processors, transmission of the wayfinding information to the client device of the rider so that the wayfinding information is presentable to the rider via a user interface of the client device.

2. The method of claim 1, wherein the map section is configured to present map information to the rider support agent that encompasses map information presentable to the rider via the user interface of the client device.

3. The method of claim 2, wherein the wayfinding information includes a graphical change to the map information presentable on the user interface of the client device.

4. The method of claim 1, wherein the map section is configured to present map information to the rider support agent that is different than map information presentable to the rider via the user interface of the client device.

5. The method of claim 1, wherein the wayfinding information includes verbal instructions to guide the rider to a pickup location of the autonomous vehicle.

6. The method of claim 1, wherein generating the information about the autonomous vehicle trip further includes at least one of a state status section, a fare section or a vehicle access section.

7. The method of claim 1, further comprising:
   creating, in response to input from the rider support agent, one or more annotations to augment the wayfinding information to be presented to the rider.

8. The method of claim 7, wherein the one or more annotations include at least one augmented reality insert.

9. The method of claim 1, wherein the imagery captured by the client device is not maintained in long-term persistent storage by the rider support system.

10. The method of claim 1, wherein the wayfinding information includes a tone, a tune or a melody as the rider approaches the autonomous vehicle.

11. The method of claim 1, wherein the wayfinding information includes haptic feedback to either indicate a direction to head towards or to move away from.

12. The method of claim 1, further comprising modifying an image presentation mode for the imagery captured by the client device.

13. The method of claim 1, further comprising making one or more modifications to the imagery captured by the client device.

14. The method of claim 1, further comprising:
   generating or obtaining an indicium of the rider support agent; and
   causing the indicium of the rider support agent to be presented to the rider via the user interface of the client device.

15. The method of claim 1, further comprising:
   upon determination that the rider has arrived at a pickup location of the autonomous vehicle or is within a certain threshold distance of the autonomous vehicle, causing the user interface of the client device to illustration a representation of the autonomous vehicle.

16. The method of claim 15, wherein the representation of the vehicle includes highlighting a door of the autonomous vehicle.

17. The method of claim 1, further comprising:
   upon determination that the rider is within a certain proximity of the autonomous vehicle, the one or more processors causing remote unlocking of a door or a trunk of the autonomous vehicle.

18. The method of claim 1, further comprising:
   upon determination that the rider is within a certain proximity of the autonomous vehicle, the one or more processors causing actuation of one or more systems of the autonomous vehicle prior to the rider entering the autonomous vehicle.

19. The method of claim 18, wherein actuation of the one or more systems of the autonomous vehicle includes remotely causing honking of a horn of the autonomous vehicle.

20. The method of claim 18, wherein actuation of the one or more systems of the autonomous vehicle includes remotely causing one or more lights of the autonomous vehicle to flash.

21. A rider support system comprising:
   a rider support user interface; and
   one or more processors, the one or more processors being configured to:
      generate information about an autonomous vehicle trip for display on the rider support user interface, the information for display including a general trip information section, a vehicle information section, a map section and an imagery section;
      upon authorization to share imagery captured by a client device of a rider, receive the imagery captured by the client device;

insert at least one still image or a video from the imagery into the imagery section of the rider support user interface;

receive, via the rider support user interface, from a rider support agent, wayfinding information regarding the autonomous vehicle trip; and cause transmission of the wayfinding information to the client device of the rider so that the wayfinding information is presentable to the rider via a user interface of the client device.

* * * * *